US012591086B2

(12) United States Patent
Ono et al.

(10) Patent No.: US 12,591,086 B2
(45) Date of Patent: Mar. 31, 2026

(54) LIGHT GUIDE AND VIDEO DISPLAY DEVICE

(71) Applicant: FUJIFILM Corporation, Tokyo (JP)

(72) Inventors: Katsuhiko Ono, Sano (JP); Hiroki Takahashi, Saitama (JP); Takuya Okada, Sano (JP)

(73) Assignee: FUJIFILM Corporation, Tokyo (JP)

( * ) Notice: Subject to any disclaimer, the term of this patent is extended or adjusted under 35 U.S.C. 154(b) by 268 days.

(21) Appl. No.: 18/338,119

(22) Filed: Jun. 20, 2023

(65) Prior Publication Data

US 2023/0333303 A1 Oct. 19, 2023

Related U.S. Application Data

(63) Continuation of application No. PCT/JP2021/045702, filed on Dec. 10, 2021.

(30) Foreign Application Priority Data

Dec. 28, 2020 (JP) .................................. 2020-219155

(51) Int. Cl.
*F21V 8/00* (2006.01)
*G02B 1/10* (2015.01)
(Continued)

(52) U.S. Cl.
CPC ............. *G02B 6/0025* (2013.01); *G02B 1/10* (2013.01); *G02B 17/004* (2013.01);
(Continued)

(58) Field of Classification Search
CPC ...... G02B 1/10; G02B 6/0025; G02B 17/004; G02B 17/006; G02B 27/0172; G02B 2027/0178
See application file for complete search history.

(56) References Cited

U.S. PATENT DOCUMENTS 5,835,273 A 11/1998 Ida et al.
8,432,614 B2 4/2013 Amitai
(Continued)

FOREIGN PATENT DOCUMENTS

CN 111164494 A 5/2020
CN 111610635 A 9/2020
(Continued)

OTHER PUBLICATIONS

International Search Report issued in PCT/JP2021/045702; mailed Mar. 1, 2022.
(Continued)

*Primary Examiner* — Daniel Petkovsek
(74) *Attorney, Agent, or Firm* — Studebaker Brackett PLLC

(57) ABSTRACT

Provided is a light guide including: a base that has a first reflecting surface and a second reflecting surface and that propagates incident video light; and a plurality of half mirrors, each of which has a first surface and a second surface and is configured to include a dielectric multi-layer film, in which the plurality of half mirrors are disposed in the base such that the half mirrors are spaced from each other, the base and the plurality of half mirrors are configured such that the video light made incident into the base is incident on each of the first surface and the second surface of at least one of the plurality of half mirrors one or more times, and refractive indices of two outermost layers of the dielectric multi-layer film are 0.90n to 1.15n in a case in which a refractive index of the base is n.

16 Claims, 19 Drawing Sheets

(51) Int. Cl.
    *G02B 17/00*        (2006.01)
    *G02B 27/01*        (2006.01)

(52) U.S. Cl.
    CPC ....... *G02B 17/006* (2013.01); *G02B 27/0172* (2013.01); *G02B 2027/0125* (2013.01); *G02B 2027/0178* (2013.01)

(56)        References Cited

U.S. PATENT DOCUMENTS

| | | | | |
|---|---|---|---|---|
| 11,256,004 | B2 * | 2/2022 | Haba ................. | G02B 27/1073 |
| 2003/0165017 | A1 | 9/2003 | Amitai | |
| 2013/0070344 | A1 | 3/2013 | Takeda et al. | |
| 2015/0138451 | A1 | 5/2015 | Amitai | |
| 2018/0039082 | A1 | 2/2018 | Amitai | |
| 2019/0293838 | A1 | 9/2019 | Haba et al. | |
| 2020/0150332 | A1 | 5/2020 | Nakamura et al. | |
| 2020/0233217 | A1 | 7/2020 | Kuno et al. | |
| 2021/0018755 | A1 | 1/2021 | Amitai | |
| 2021/0041699 | A1 | 2/2021 | Ukai et al. | |
| 2023/0088054 | A1 | 3/2023 | Amitai | |
| 2023/0333303 | A1 | 10/2023 | Ono et al. | |

FOREIGN PATENT DOCUMENTS

| | | | |
|---|---|---|---|
| EP | 4042233 | B1 | 8/2024 |
| JP | S58-190906 | A | 11/1983 |
| JP | 2019-219684 | A | 12/2019 |
| JP | 2020-024237 | A | 2/2020 |
| JP | 2020-118840 | A | 8/2020 |
| JP | 7331274 | B2 | 8/2023 |
| WO | 93/19393 | A1 | 9/1993 |
| WO | 2018/221026 | A1 | 12/2018 |
| WO | 2019/087576 | A1 | 5/2019 |

OTHER PUBLICATIONS

International Preliminary Report on Patentability (Chapter I) and Written Opinion of the International Searching Authority issued in PCT/JP2021/045702; issued Jul. 4, 2023.
Anonymous; "Dielectric mirror—Wikipedia", Nov. 5, 2020, XP093112696, https://en.wikipedia.org/w/index.php?title=Dielectric_mirror&oldid=987244811, total 3 pages.
Anonymous; "Silicon oxynitride—Wikipedia", Jun. 3, 2015, XP093113100, https://en.wikipedia.org/w/index.php?title=Silicon_oxynitride&oldid=960480605, total 3 pages.
Wang Qiwei et al.; "Stray light and tolerance analysis of an ultrathin waveguide display", Applied Optics, vol. 54, No. 28, Oct. 1, 2015, p. 8354, XP093112385.
The extended European search report issued by the European Patent Office on Jan. 15, 2024, which corresponds to European Patent Application No. 21915069.5-1020 and is related to U.S. Appl. No. 18/338,119.
Communication pursuant to Article 94(3) EPC issued by the European Patent Office on Sep. 23, 2024, which corresponds to European Patent Application No. 21915069.5-1001 and is related to U.S. Appl. No. 18/338,119.
An Office Action; "Notice of Reasons for Refusal," mailed by the Japanese Patent Office on Mar. 5, 2024, which corresponds to Japanese Patent Application No. 2023-130440 and is related to U.S. Appl. No. 18/338,119; with English language translation.
An Office Action mailed by China National Intellectual Property Administration on Jan. 27, 2026, which corresponds to Chinese Patent Application No. 202180087318.6 and is related to U.S. Appl. No. 18/338,119; with English language translation.

\* cited by examiner

FIG. 5

FIG. 14A
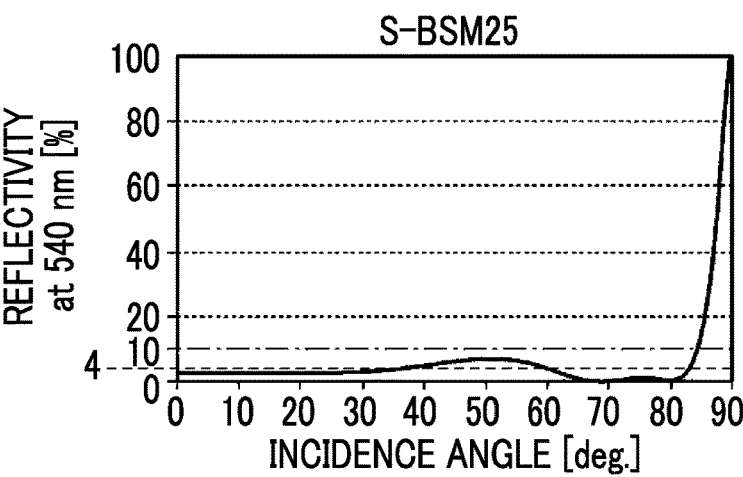
FIG. 14B
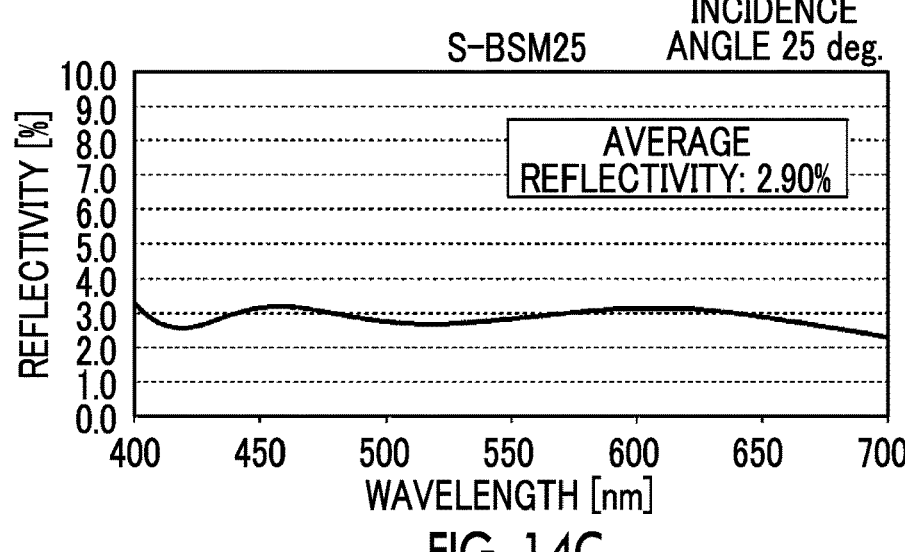
FIG. 14C

LIGHT GUIDE AND VIDEO DISPLAY DEVICE

CROSS-REFERENCE TO RELATED APPLICATIONS

This application is a continuation of International Application No. PCT/JP2021/045702, filed on Dec. 10, 2021, which claims priority from Japanese Patent Application No. 2020-219155, filed on Dec. 28, 2020. The entire disclosure of each of the above applications is incorporated herein by reference.

BACKGROUND

1. Technical Field

The present disclosure relates to a light guide and a video display device.

2. Related Art

In recent years, as a next-generation video display device, a head mounting type "wearable display", such as a head-mounted display, has been actively developed.

The head-mounted display has an optical system comprising a light guide that guides a video output from a video light generation unit to eyes of a wearer. The light guide is classified roughly into a reflection type using a partially reflecting surface, a volumetric hologram type, and a diffractive element type. For example, WO2019/087576A and JP2020-118840A disclose a reflection type light guide. The light guide disclosed in WO2019/087576A, JP2020-118840A, and JP2019-219684A is a light guide that propagates video light while totally reflecting the video light, and has a configuration in which a plurality of partially reflecting surfaces that reflect a part of the video light and output the part to an outside, and that transmit a part of the video light are disposed substantially parallel to each other along a propagation direction of the video light inside the light guide.

SUMMARY

An object of the technology of the present disclosure is to provide a light guide and a video display device capable of displaying a video having high contrast.

A light guide according to the present disclosure comprises: a base that has a first reflecting surface and a second reflecting surface and that propagates incident video light while totally reflecting the video light by the first reflecting surface and the second reflecting surface; and a plurality of half mirrors, each of which has a first surface and a second surface on a back side of the first surface and is configured to include a dielectric multi-layer film, in which the plurality of half mirrors are disposed in the base such that the half mirrors are spaced from each other by being tilted with respect to the first reflecting surface and the second reflecting surface, the base and the plurality of half mirrors are configured such that the video light made incident into the base is incident on each of the first surface and the second surface of at least one of the plurality of half mirrors one or more times, and refractive indices of two outermost layers of the dielectric multi-layer film on a first surface side and a second surface side are 0.90n to 1.15n in a case in which a refractive index of the base is n.

In the light guide according to the present disclosure, it is preferable that the refractive indices of the outermost layers of the dielectric multi-layer film are 0.95n to 1.10n, and it is more preferable that the refractive indices of the outermost layers of the dielectric multi-layer film are 1.00n to 1.05n.

In the light guide according to the present disclosure, it is preferable that in a case in which film thicknesses of the outermost layers of the dielectric multi-layer film are d [nm], the refractive indices of the outermost layers are n1, and $\Delta n=\{(n-n1)/n\}\times100[\%]$, $\Delta n\cdot d$ [%·nm] is in a range of −300 to +300.

In the light guide according to the present disclosure, it is preferable that a tilt angle of the half mirror with respect to the first reflecting surface and the second reflecting surface is such that in a case in which the video light made incident into the base is incident on the first surface at an incidence angle of 5° to 35°, transmitted light transmitted through the half mirror of the incident video light is able to be re-incident from the second surface after being reflected by the first reflecting surface or the second reflecting surface.

In the light guide according to the present disclosure, it is preferable that the tilt angle of the half mirror is an angle in which an incidence angle in a case in which the transmitted light is re-incident from the second surface is in a range of 55° to 85°.

In the light guide according to the present disclosure, it is preferable that in the dielectric multi-layer film, a layer of low refractive index having a relatively low refractive index and a layer of high refractive index having a relatively high refractive index are alternately laminated.

In the light guide according to the present disclosure, it is preferable that at least one of the two outermost layers of the dielectric multi-layer film and the base are bonded by optical contact.

In the light guide according to the present disclosure, it is preferable that the two outermost layers of the dielectric multi-layer film and the base are in direct contact with each other.

In the light guide according to the present disclosure, it is preferable that no adhesive is present between the half mirror and the base.

In the light guide according to the present disclosure, each layer of the dielectric multi-layer film may contain silicon, oxygen, and nitrogen.

In the light guide according to the present disclosure, each layer of the dielectric multi-layer film may be a metal oxide layer containing at least one of silicon, niobium, tantalum, aluminum, titanium, tungsten, or chromium.

In the light guide according to the present disclosure, it is preferable that the refractive index of the base is 1.5 or more.

In the light guide according to the present disclosure, it is preferable that the base is a parallel flat plate in which the first reflecting surface and the second reflecting surface are parallel to each other.

In the light guide according to the present disclosure, it is preferable that the plurality of half mirrors are arranged in parallel to each other in a direction in which the video light propagates.

In the light guide according to the present disclosure, it is preferable that the half mirror has an average reflectivity of 2% to 4% with respect to light with a wavelength of 400 nm to 700 nm that is incident at an incidence angle of 5° to 35°, and has an average reflectivity of 10% or less with respect to the light with the wavelength of 400 nm to 700 nm that is incident at an incidence angle of 55° to 85°.

A light guide according to another aspect of the present disclosure comprises: a base that has a first reflecting surface and a second reflecting surface and that propagates incident video light while totally reflecting the video light by the first reflecting surface and the second reflecting surface; and a plurality of half mirrors, each of which has a first surface and a second surface on a back side of the first surface and is configured to include a dielectric multi-layer film, in which the plurality of half mirrors are disposed in the base such that the half mirrors are spaced from each other by being tilted with respect to the first reflecting surface and the second reflecting surface, the base and the plurality of half mirrors are configured such that the video light made incident into the base is incident on each of the first surface and the second surface of at least one of the plurality of half mirrors one or more times, and the half mirror has an average reflectivity of 2% to 4% with respect to light with a wavelength of 400 nm to 700 nm that is incident at an incidence angle of 5° to 35°, and has an average reflectivity of 10% or less with respect to the light with the wavelength of 400 nm to 700 nm that is incident at an incidence angle of 55° to 85°.

A video display device according to the present disclosure comprises: a video light generation unit that generates video light; the light guide according to the present disclosure, which propagates the incident video light; and an optical coupling member that makes the video light generated by the video light generation unit incident into the light guide.

According to the light guide and the video display device according to the present disclosure, it is possible to obtain a video having high contrast.

BRIEF DESCRIPTION OF THE DRAWINGS

FIG. 5 is a schematic diagram for explaining an optical path of video light in the light guide 12.

FIG. 14A is a diagram showing an incidence angle dependence of a reflectivity for light with a wavelength of 540 nm with respect to a half mirror of Design Example 2. FIG. 14B is a diagram showing a wavelength dependence of a reflectivity with respect to an incidence angle of 25° for the half mirror of Design Example 2. FIG. 14C is a diagram showing a wavelength dependence of a reflectivity with respect to an incidence angle of 75° for the half mirror of Design Example 2.

DESCRIPTION OF EMBODIMENTS

Hereinafter, embodiments of the present disclosure will be described with reference to the drawings.

In the present specification, a numerical range represented by "to" means a range including numerical values before and after "to" as a lower limit value and an upper limit value.

"Video Display Device"

Figure 1:
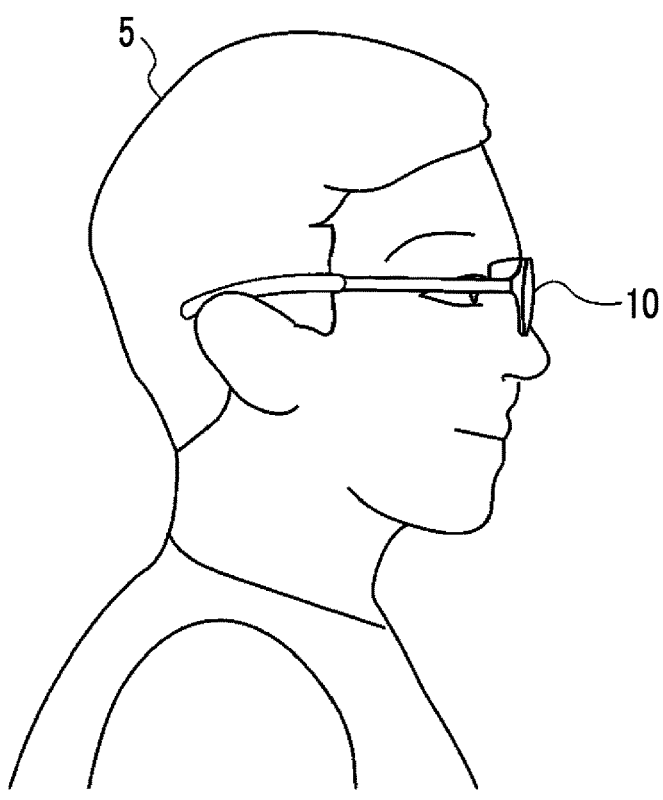
FIG. 1 is an external view showing a usage state of an HMD, which is an embodiment of a video display device comprising a light guide 12 according to an embodiment of the present disclosure.
Figure 2:
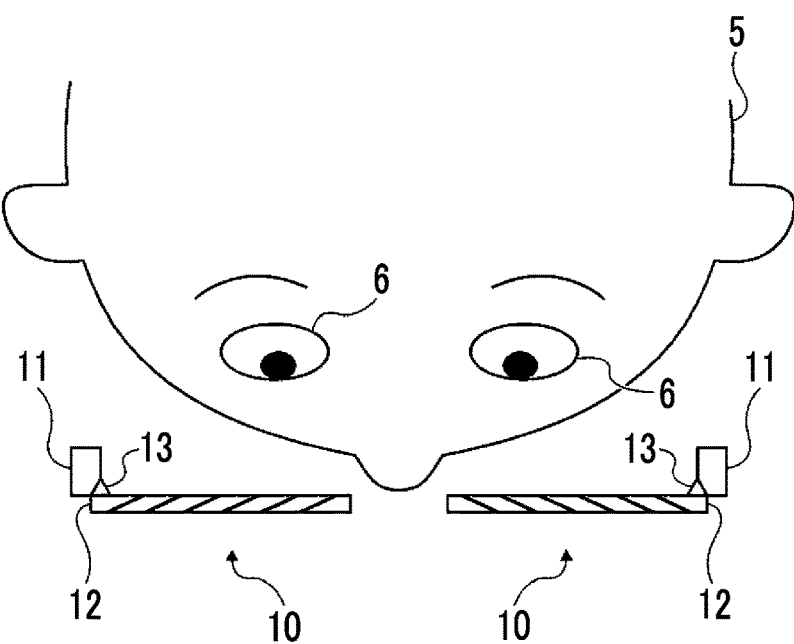
FIG. 2 is a view of a user 5 wearing an HMD 10 as viewed from above a head.
Figure 3:
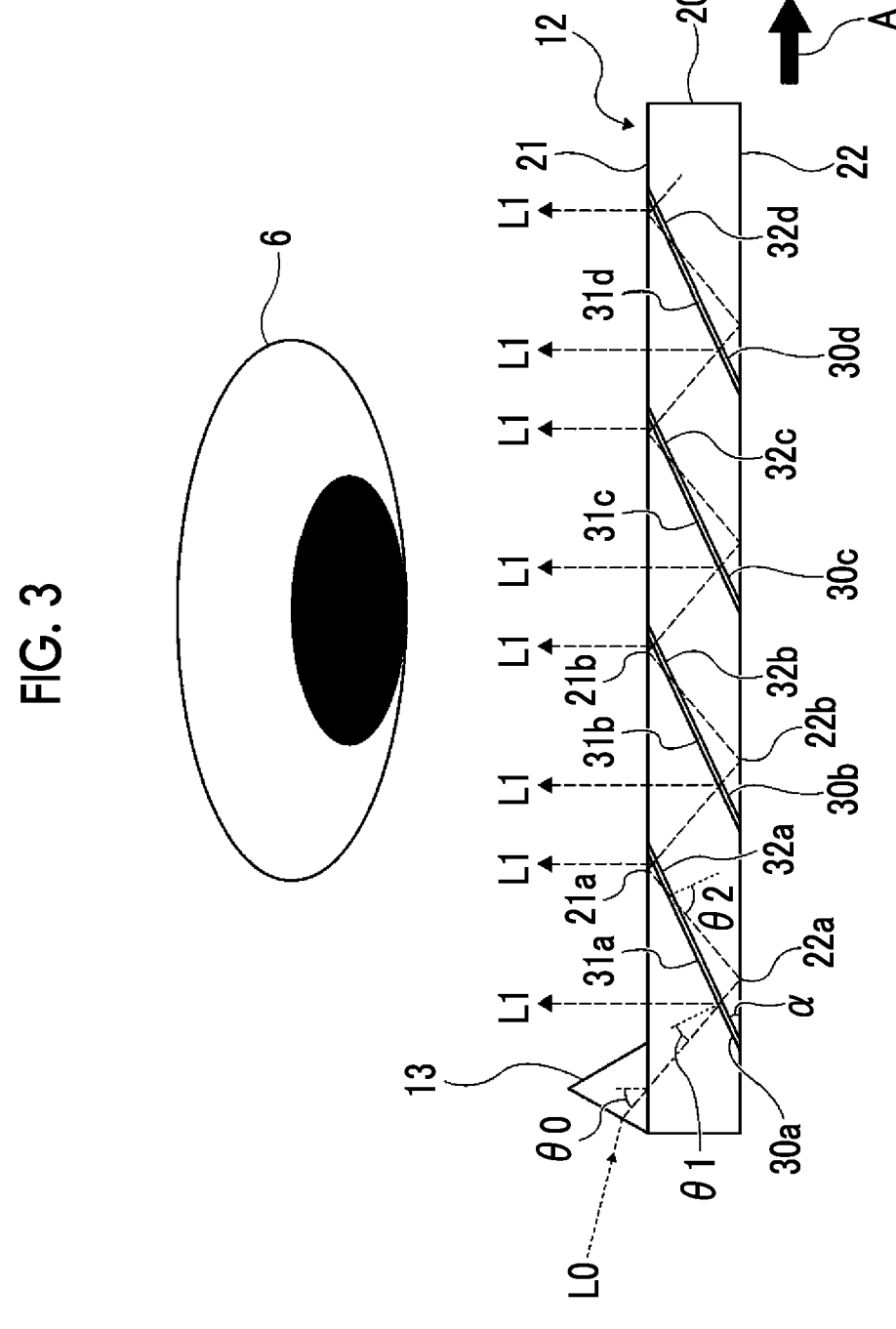
FIG. 3 is an enlarged view showing the light guide 12.

FIG. 1 shows an appearance of a head-mounted display (HMD) 10 which is an embodiment of a video display device of the present disclosure. The HMD 10 comprises an embodiment of a light guide of the present disclosure. The HMD 10 is used, for example, by being worn on a head of a user 5. FIG. 2 is a view of the user 5 wearing the HMD 10 as viewed from above the head. FIG. 3 is an enlarged view showing a light guide 12.

The HMD 10 comprises a video light generation unit 11, a light guide 12, and an optical coupling member 13.

The video light generation unit 11 generates video light and emits the video light toward the optical coupling member 13. The video light generation unit 11 comprises, for example, a light source unit, a video light generation element that generates video light, and a projection optical unit for projecting the video light.

The light source unit comprises, for example, a light source including each of red, green, and blue light emitting diodes (LEDs) or laser diodes (LDs), and a lens for irradiating the video light generation element with light from the light source.

The video light generation element comprises a display element that displays a video based on a video signal, and generates video light by modulating the light incident from the light source unit with the display element. As the display element, for example, a liquid crystal panel or a digital mirror device (DMD) is used.

The projection optical unit comprises a projection lens consisting of one or a plurality of lenses, and projects the video light generated by the video light generation element onto the optical coupling member 13.

The light guide 12 is positioned in front of an eye 6 of the user 5 in a case of wearing the light guide 12, and the video light generated by the video light generation unit 11 is incident into the light guide 12. The light guide 12 propagates the incident video light, and emits the video light toward the user 5, thereby making the user 5 visually recognize a video. The video visually recognized by the user 5 may be a still image or a video image. As shown in FIG. 3, the light guide 12 comprises a base 20 and a plurality of half mirrors 30a, 30b, 30c, and 30d disposed in the base 20. The base 20 has a first reflecting surface 21 and a second reflecting surface 22, and video light L0 propagates in the base 20 by repeated total reflection on the first reflecting surface 21 and the second reflecting surface 22. The half mirrors 30a, 30b, 30c, and 30d reflect a part of the incident light and transmit the others. As an example, a reflectivity of each of the half mirrors 30a, 30b, 30c, and 30d is about 2% to 10%. The video light L0 is partially reflected by each of the plurality of half mirrors 30 disposed in the base 20 and emitted from the base 20 as emitted light L1 to make the user 5 visually recognize the video.

In addition, in the present specification, a reflectivity is shown as an average value of a reflectivity for p-polarized light and a reflectivity for s-polarized light.

The optical coupling member 13 makes the video light L0 generated by the video light generation unit 11 incident into the light guide 12. The optical coupling member 13 is an optical coupling prism in the present example. In the present embodiment, one surface of the optical coupling member 13 is disposed in contact with the first reflecting surface 21 of the light guide 12. The optical coupling member 13 introduces the video light L0 into the light guide 12 such that the video light L0 is incident on the first reflecting surface 21 and the second reflecting surface 22 at an angle at which the video light L0 is totally reflected and propagates in the light guide 12. In addition, the optical coupling member 13 introduces the video light L0 into the light guide 12 such that the video light L0 is incident on a first surface 31a of the half mirror 30a at a desired incidence angle θ1. The optical coupling member 13 introduces the video light L0 into the light guide 12 such that the incidence angle θ1 of the video light L0 on the first surface 31a of the half mirror 30a in the light guide 12 is, for example, 5° to 35°. Here, the incidence angle means an angle formed by a normal line of a surface on which light is incident and a ray.

"Light Guide"

Hereinafter, details of the light guide 12 will be described.

The light guide 12 is an embodiment of the light guide according to the present disclosure. As described above, the light guide 12 comprises the base 20 and the plurality of half mirrors 30a, 30b, 30c, and 30d. The base 20 has the first reflecting surface 21 and the second reflecting surface 22, and propagates the incident video light L0 while totally reflecting the video light L0 by the first reflecting surface 21 and the second reflecting surface 22. In the present embodiment, the base 20 is a parallel flat plate in which the first reflecting surface 21 and the second reflecting surface 22 are parallel to each other. Here, the parallel flat plate means that the first reflecting surface 21 and the second reflecting surface 22 by which the video light L0 is reflected and propagates are plate-shaped members disposed in parallel to each other. Of course, the term "parallel flat plate" according to the technology of the present disclosure also includes a shape having unevenness in a region that does not affect the propagation of light in a part of an outer peripheral surface of the parallel flat plate or a shape having a portion where the first reflecting surface 21 and the second reflecting surface 22 are non-parallel. The use of the parallel flat plate facilitates the optical path design. In the base 20, the first reflecting surface 21 and the second reflecting surface need not necessarily be parallel to each other in a case in which the video light L0 propagates between the first reflecting surface 21 and the second reflecting surface 22 by repeatedly being totally reflected and a video is visible by the emitted light L1 reflected by the half mirror 30.

The base 20 is not particularly limited as long as it is a transparent member. A refractive index n of the base 20 is preferably 1.5 or more, more preferably 1.7 or more, and still more preferably 1.8 or more. As the refractive index is higher, light leak from the light guide to an outside can be reduced, and a good video can be obtained.

In the present embodiment, the plurality of half mirrors 30a, 30b, 30c, and 30d are arranged in parallel to each other in a direction in which the video light propagates. The half mirrors 30a, 30b, 30c, and 30d have first surfaces 31a, 31b, 31c, and 31d and second surfaces 32a, 32b, 32c, and 32d on a back side of the first surfaces 31a, 31b, 31c, and 31d, respectively. In a case in which the plurality of half mirrors are not distinguished individually below, the subscripts attached to the reference numerals, such as a, b, c, and d, are omitted and are simply referred to as a half mirror 30, a first surface 31, and a second surface 32.

The plurality of half mirrors 30 are disposed in the base 20 such that the half mirrors are spaced from each other by being tilted with respect to the first reflecting surface 21 and the second reflecting surface 22. A tilt angle α of the half mirror 30 with respect to the first reflecting surface 21 and the second reflecting surface 22 is referred to as a tilt angle α of the half mirror 30.

As shown in FIG. 3, the video light L0 made incident into the base 20 is repeatedly totally reflected by the first reflecting surface 21 and the second reflecting surface 22 of the base 20 and propagates in a direction A parallel to the first reflecting surface 21 and the second reflecting surface 22. In this case, the video light L0 propagates through the plurality of half mirrors 30 provided in the base 20 once or a plurality of times. In a case in which the video light L0 is incident on the first surface 31 of the half mirror 30, a part of the video light L0 is reflected by the half mirror 30 and emitted as emitted light L1.

The base 20 and the plurality of half mirrors 30 are configured such that the video light L0 made incident into the base 20 is incident on each of the first surface 31 and the second surface 32 of at least one of the plurality of half mirrors 30 one or more times. For example, as shown in FIG. 3, the video light L0 incident on the first reflecting surface 21 of the base 20 via the optical coupling member 13 at an optical coupling angle $\theta 0$ is incident on the first surface 31a of the half mirror 30a. In this case, a part of the video light L0 is reflected by the half mirror 30a and emitted from the base 20 as emitted light L1. The video light L0 that has passed through the half mirror 30a without being reflected is incident on a point 22a of the second reflecting surface 22. The video light L0 incident on the second reflecting surface 22 is totally reflected and is incident on the second surface 32a of the half mirror 30a at an incidence angle $\theta 2$. The video light L0 incident on the half mirror 30a from the second surface 32a and transmitted through the half mirror 30a is incident on a point 21a on the first reflecting surface 21 and is totally reflected. The video light L0 reflected by the first reflecting surface 21 is incident again on the first surface 31 of the half mirror 30a, and a part of the video light L0 is emitted from the base 20 as emitted light L1. As described above, in the example shown in FIG. 3, the video light L0 incident on the base 20 is incident on the first surface 31 of the half mirror 30a twice and is incident on the second surface 32 once.

Figure 4:
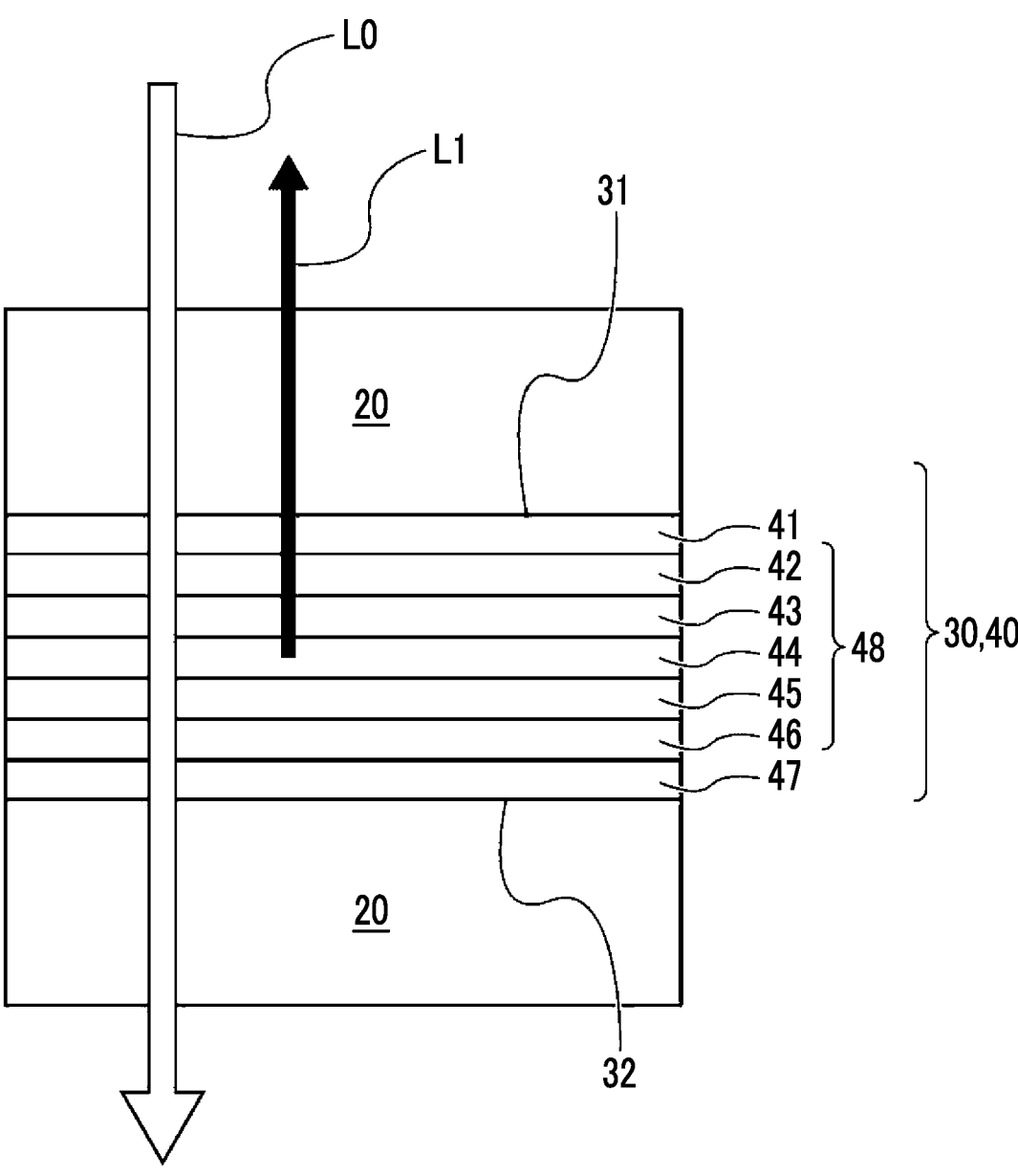
FIG. 4 is a diagram schematically showing a configuration of one half mirror 30 provided in a base 20.

FIG. 4 is a diagram schematically showing a configuration of one half mirror 30 provided in the base 20. As shown in FIG. 4, the half mirror 30 includes a dielectric multi-layer film 40 formed by laminating a plurality of dielectric layers 41 to 47. In the present embodiment, the half mirror 30 is made of a dielectric multi-layer film 40. In FIG. 4, the dielectric multi-layer film 40 comprises seven dielectric layers 41 to 47, but the number of the dielectric layers is not limited as long as the dielectric multi-layer film 40 functions as the half mirror 30.

The dielectric multi-layer film 40 is formed by laminating a plurality of dielectric layers having different refractive indices. Refractive indices of two outermost layers 41 and 47 out of the plurality of dielectric layers constituting the dielectric multi-layer film 40 are 0.90n to 1.15n in a case in which the refractive index of the base 20 is n. The refractive indices of the outermost layers 41 and 47 are preferably 0.95n to 1.10n, and more preferably 1.00n to 1.05n. The outermost layer in the dielectric multi-layer film 40 means the outermost layer among the layers sensed by the incident video light. Here, the layer sensed by the video light conceptually means the layer which affects the video light such as refraction, and specifically refers to a layer where an optical path length $n \cdot d$, which is indicated by a product of a refractive index n of the dielectric film and a physical film thickness d of the dielectric film, is greater than 10 nm. Therefore, even though a layer having $n \cdot d$ of 10 nm or less is disposed between the dielectric multi-layer film 40 and the base 20, such a layer does not correspond to the outermost layer of the dielectric multi-layer film 40.

Figure 5:
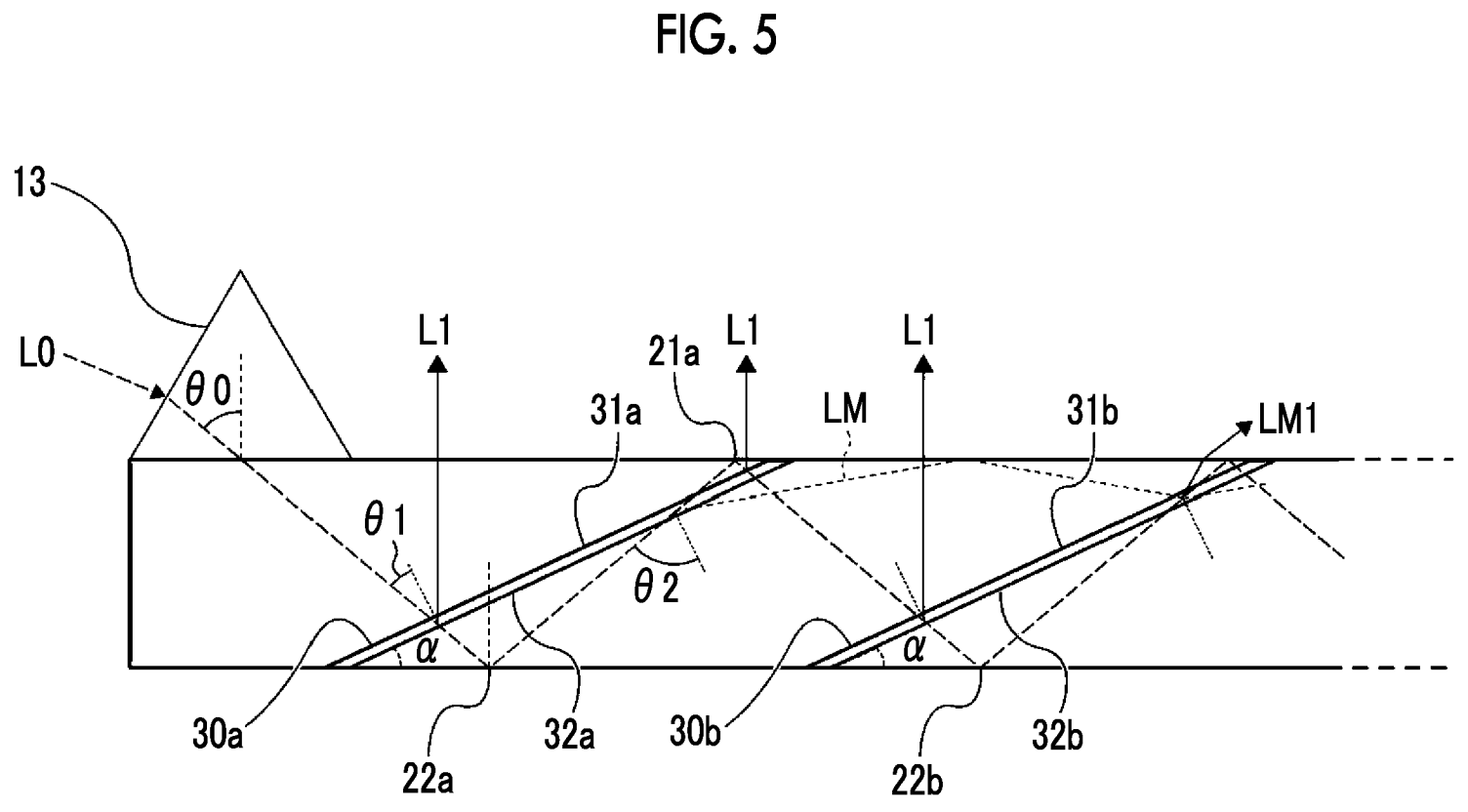

As described above, in the light guide 12 of the present embodiment, the base 20 and the plurality of half mirrors 30 are configured such that the video light L0 made incident into the base 20 is incident on each of the first surface 31 and the second surface 32 of at least one of the plurality of half mirrors 30 one or more times. Therefore, as shown in FIG. 5, the video light L0 incident and transmitted from the first surface 31a of the half mirror 30a is reflected by the second reflecting surface 22 and is incident on the half mirror 30a again from the second surface 32a. In this case, the light reflected by the half mirror 30a, which is incident from the second surface 32a, is stray light LM, and a part of the stray light LM is emitted to the outside as uncontrollable unnecessary light LM1.

In a case in which the amount of the stray light LM reflected by being incident from the second surface 32a of the half mirror 30a is large, the amount of the video light L0 propagating to the half mirror 30b disposed in a rear stage and the amount of light reflected by the first surface 31b of the half mirror 30b and emitted as the emitted light L1 are greatly reduced. This is repeated, and the emitted light L1 in the half mirror disposed in a further rear stage shows a marked decrease in light amount. In a case in which the amount of the emitted light L1 is reduced, the visually recognized video becomes dark. In addition, a part of the stray light LM is emitted from the base 20 without angle control, so that the image may be blurred or appear to be duplicated. As described above, in a case in which the reflected light amount of the video light L0 reflected by the second surface 32 of the half mirror 30 is large, a problem arises in that the contrast of the video decreases. This is a problem peculiar to the light guide 12 configured such that the video light L0 is incident on one half mirror 30 a plurality of times, that is, the video light L0 is incident on each of the first surface 31 and the second surface 32 at least one or more times.

The half mirror 30 provided in the light guide 12 is designed to have a desired reflectivity in a case in which the video light L0 is incident on the first surface 31, from which the reflected light is emitted to the outside as the emitted light L1, at the incidence angle $\theta 1$. In this case, in the related art, the video light L0 is generally incident only once on the half mirror 30, so that a reflectivity of the incidence angle $\theta 2$ of the video light L0 on the second surface 32 was not taken into consideration.

On the other hand, the present inventors have found that it is possible to effectively suppress the reflectivity in a case in which the video light L0 is incident on the second surface 32 of the half mirror 30 by setting the refractive indices of the two outermost layers 41 and 47 out of the plurality of dielectric layers constituting the dielectric multi-layer film 40 of the half mirror 30 to 0.90n to 1.15n in a case in which the refractive index of the base 20 is n (see Design Example described below).

In the light guide 12 of the present embodiment, the refractive indices of the outermost layer 41 on the first surface 31 side and the outermost layer 47 on the second surface 32 side of the dielectric multi-layer film 40 constituting the half mirror 30 are 0.90n to 1.15n, so that the reflectivity on the second surface 32 of the half mirror 30 can be suppressed. Since the reflectivity of the half mirror 30 with respect to the incidence on the second surface 32 can be suppressed, a decrease in the amount of the video light L0 and the generation of stray light can be suppressed, and a high-contrast video can be obtained.

The incidence angle $\theta 1$ on the first surface 31 of the half mirror 30 is preferably 5° to 35°. In addition, the incidence angle $\theta 2$ on the second surface 32 of the half mirror 30 is preferably 55° to 85° (see Verification Example described below).

Figure 6:
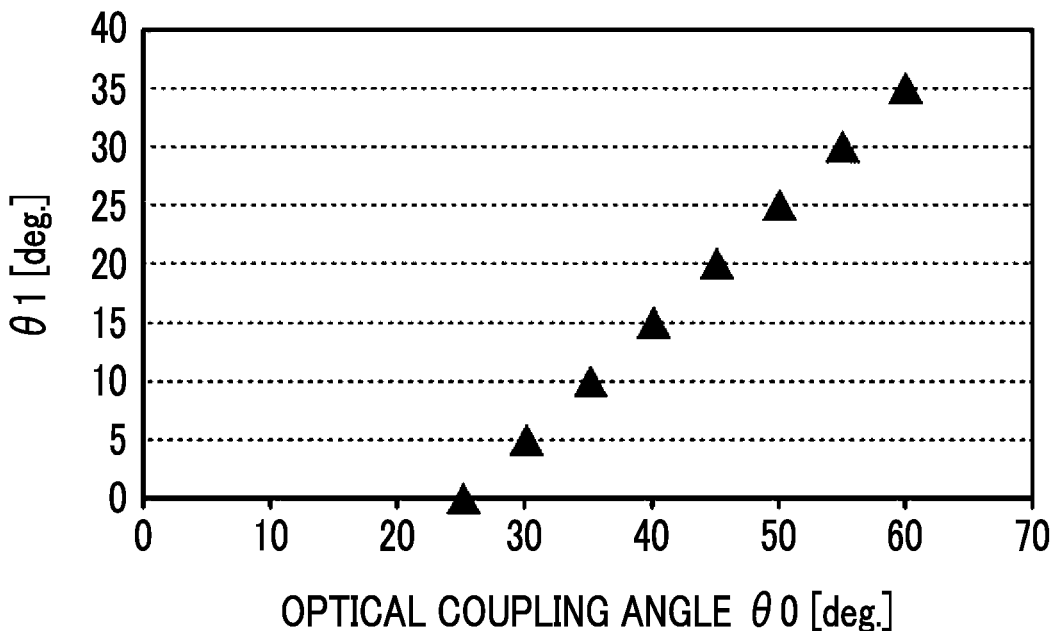
FIG. 6 is a diagram showing a relationship between an optical coupling angle θ0 and an incidence angle θ1.

The incidence angle $\theta 1$ of the video light $L0$ incident on the first surface 31 of the half mirror 30 changes depending on the optical coupling angle $\theta 0$ which is the incidence angle of the video light $L0$ into the light guide. For example, in a case in which the tilt angle $\alpha$ of the half mirror 30 is 25°, a relationship between the optical coupling angle $\theta 0$ and the incidence angle $\theta 1$ is as shown in FIG. 6. A relationship between the incidence angle $\theta 1$ and the incidence angle $\theta 2$ of the video light $L0$, which is incident on the first surface 31 at the incidence angle $\theta 1$ and then totally reflected by the second reflecting surface 22 and incident on the second surface 32, is as shown in FIG. 7.

Figure 7:
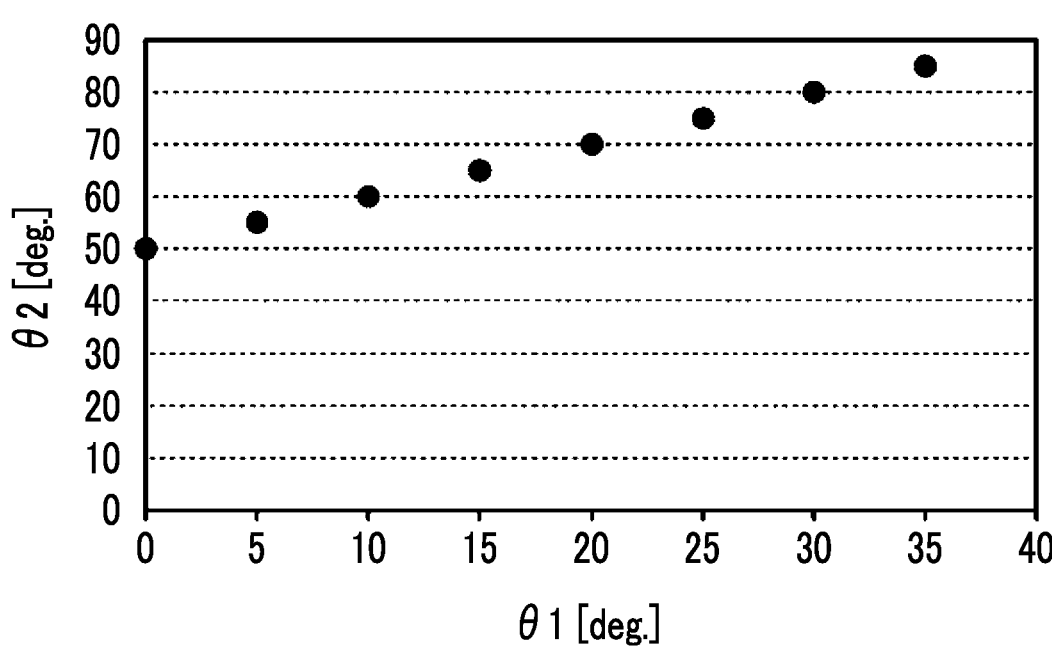
FIG. 7 is a diagram showing a relationship between an incidence angle θ1 and an incidence angle θ2.

That is, in the example shown in FIG. 6 and FIG. 7, in a case in which the optical coupling angle $\theta 0$ is 50°, the incidence angle $\theta 1$ is 25° and the incidence angle $\theta 2$ is 75°. In addition, in a case in which the optical coupling angle $\theta 0$ is 40°, the incidence angle $\theta 1$ is 15° and the incidence angle $\theta 2$ is 65°. The relationship between the optical coupling angle $\theta 0$ and the incidence angle $\theta 1$ and the incidence angle $\theta 2$ changes depending on the tilt angle $\alpha$ of the half mirror 30.

In an actual system, the tilt angle $\alpha$ and the optical coupling angle $\theta 0$ of the half mirror are selected such that the incidence angle $\theta 1$ and the incidence angle $\theta 2$ are desired values. The tilt angle $\alpha$ is, for example, 5° to 35°. As shown in the example shown in FIG. 7, in general, the incidence angle $\theta 1$ of the video light $L0$ on the first surface 31 of the half mirror 30 and the incidence angle $\theta 2$ of the video light $L0$ on the second surface 32 are significantly different from each other. In addition, in general, the reflectivity of the half mirror 30 made of the dielectric multi-layer film 40 with respect to light has an incidence angle dependence. As described above, in the related art, only the reflectivity at the incidence angle $\theta 1$ was taken into consideration, so that the reflectivity at the incidence angle $\theta 2$ is increased, resulting in a decrease in contrast of the visually recognized image. A more specific configuration of the half mirror 30 for setting the reflectivity at the incidence angle $\theta 1$ to a desired value and sufficiently suppressing the reflectivity at the incidence angle $\theta 2$ will be described below.

It is preferable that in the dielectric multi-layer film 40 forming the half mirror 30, a layer of low refractive index having a relatively low refractive index and a layer of high refractive index having a relatively high refractive index are alternately laminated. Each layer may have a different refractive index, but layers of low refractive index having the same refractive index and layers of high refractive index having the same refractive index may be alternately laminated. In addition, for example, the dielectric multi-layer film 40 may have a configuration comprising an intermediate region 48 in which layers of low refractive index 42, 44, and 46 having a refractive index lower than that of the base 20 and layers of high refractive index 43 and 45 having a refractive index higher than that of the base 20 are alternately laminated, and the outermost layers 41 and 47 having a refractive index of 0.90n to 1.15n with respect to the refractive index n of the base 20. By alternately providing the layer of low refractive index and the layer of high refractive index, it is easy to design and produce a half mirror having a desired incidence angle-dependent reflectivity.

Each of the layers 41 to 47 of the dielectric multi-layer film 40 can contain silicon (Si), oxygen (O), and nitrogen (N). In a case in which each of the layers 41 to 47 is a silicon oxynitride film, a desired refractive index can be obtained by changing a content ratio of Si:O:N.

In addition, each of the layers 41 to 47 of the dielectric multi-layer film 40 may be a metal oxide layer containing at least one of silicon, niobium (Nb), tantalum (Ta), aluminum (Al), titanium (Ti), tungsten (W), or chromium (Cr). A metal oxide containing one or more metals can be appropriately used depending on a desired refractive index.

It is preferable that in a case in which film thicknesses of the outermost layers 41 and 47 of the dielectric multi-layer film 40 are d, the refractive indices of the outermost layers are n1, and a percentage of a difference between the refractive index n of the base 20 and the refractive index n1 is $\Delta n = \{(n-n1)/n\} \times 100[\%]$, $\Delta n \cdot d$ [%·nm] is in a range of −300 to +300. $\Delta n \cdot d$ is more preferably in a range of −200 to +200. $\Delta n \cdot d$ is still more preferably in a range of −150 to 150, and still more preferably in a range of −100 to +100. In a case in which $\Delta n \cdot d$ is in the range of −300 to +300, the reflectivity in case in which the video light $L0$ is incident on the second surface 32 of the half mirror 30 can be effectively suppressed.

As shown in FIG. 4, it is preferable that the two outermost layers 41 and 47 of the dielectric multi-layer film 40 are disposed to be in direct contact with the base 20. That is, it is preferable that no adhesive is present between the dielectric multi-layer film 40 and the base 20. It is preferable that at least one of the two outermost layers 41 and 47 of the dielectric multi-layer film 40 and the base 20 are bonded by optical contact. Here, the term "bonded by optical contact" means a state of being bonded without using an adhesive. By bonding at least one of the two outermost layers 41, 47 of the dielectric multi-layer film 40 and the base 20 together by optical contact, there is no adhesive between the two outermost layers 41 and 47 of the dielectric multi-layer film 40 and the base 20, and the two outermost layers 41 and 47 can be brought into contact with the base 20.

Details of a manufacturing method of the light guide will be described below, but an optical adhesive is generally used for bonding the optical members. However, the refractive index of a general-purpose optical adhesive is 1.5, and, in a case in which the refractive index n of the base 20 is 1.7 or more, a difference from the refractive index of the base becomes too large to make a design of the dielectric multi-layer film unviable. In addition, in a case of performing the bonding using an adhesive, a probability that a parallelism of the surfaces exceeds a target value increases, resulting in a decrease in productivity. By performing the bonding by optical contact, it is possible to solve a problem that arises in the case of performing the bonding using such an adhesive.

In the half mirror 30, the reflectivity with respect to the video light $L0$ incident on the first surface 31 at the incidence angle $\theta 1$ is preferably 1% to 4%, and more preferably 2% to 4%. In addition, in the half mirror 30, the reflectivity with respect to the video light $L0$ incident on the second surface 32 at the incidence angle $\theta 2$ is preferably 10% or less, more preferably 4% or less, still more preferably 3% or less, and still more preferably 1% or less. For the incidence of the video light $L0$ on the first surface 31, at least a part of the video light $L0$ needs to be reflected and emitted to the outside, so that it is necessary to reflect the video light $L0$ to a certain extent, but, for the incidence on the second surface 32, the smaller reflectivity is preferable from the viewpoint of suppressing the decrease in amount of the video light $L0$ and suppressing the stray light $LM$.

By setting the reflectivity with respect to the video light $L0$ incident on the second surface 32 at the incidence angle $\theta 2$ to 10% or less, it is possible to effectively suppress the generation of the stray light LM, and to stably obtain a high-contrast video.

In order to realize the above configuration, it is preferable that the half mirror 30 in the light guide 12 has an average reflectivity of 2% to 4% with respect to light with a wavelength of 400 nm to 700 nm that is incident at an incidence angle of 5° to 35°, and has an average reflectivity of 10% or less with respect to the light with the wavelength of 400 nm to 700 nm that is incident at an incidence angle of 55° to 85°. The video light is visible light and includes light with a wavelength of 400 nm to 700 nm, and in the present specification, the reflectivity with respect to the video light means an average reflectivity with respect to light with a wavelength of 400 nm to 700 nm.

As described above, the half mirror 30 is disposed at the tilt angle $\alpha$ at which the video light propagating in the light guide 12 by repeated total reflection by the first reflecting surface 21 and the second reflecting surface 22 is incident on the first surface 31 of the half mirror 30, and then incident again from the second surface 32. Here, it is preferable that the video light made incident into the light guide 12 is set so as to be incident on the first surface 31 at the incidence angle $\theta 1=5°$ to 35°, and then incident on the second surface 32 at the incidence angle $\theta 2=55°$ to 85°. In a case in which the half mirror 30 in the light guide 12 has an average reflectivity of 2% to 4% with respect to light with a wavelength of 400 nm to 700 nm that is incident at an incidence angle of 5° to 35°, and has an average reflectivity of 10% or less with respect to the light with the wavelength of 400 nm to 700 nm that is incident at an incidence angle of 55° to 85°, it is possible to effectively suppress the reflected light on the second surface 32, so that it is possible to suppress the stray light and to obtain a video having a higher contrast. In a half mirror configured of a multi-layer film, the reflectivity changes depending on the wavelength even at the same incidence angle. In addition, even at the same wavelength, the reflectivity changes as the incidence angle changes. As used herein, the term "average reflectivity" means an average value of the reflectivity with respect to light with a wavelength of 400 nm to 700 nm at a specific incidence angle. In addition, in a case in which the average reflectivity of the reflected light on the second surface is 4% or less, it is possible to obtain a video having a higher contrast.

"Production Method of Light Guide"

An example of a manufacturing method of the light guide 12 will be described below.

Figure 11:
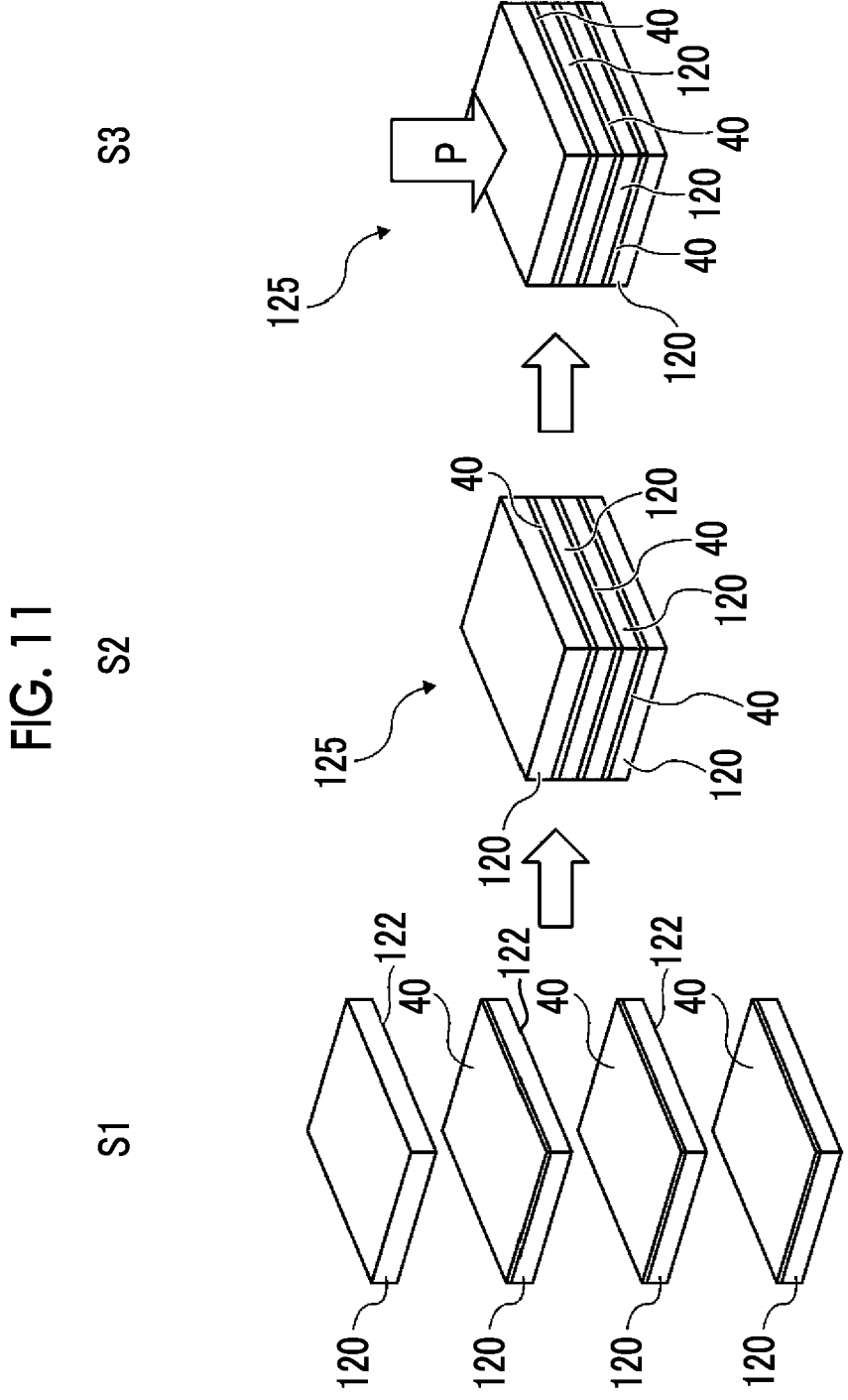
FIG. 11 is a schematic view showing a process of bonding substrates.
Figure 12A:
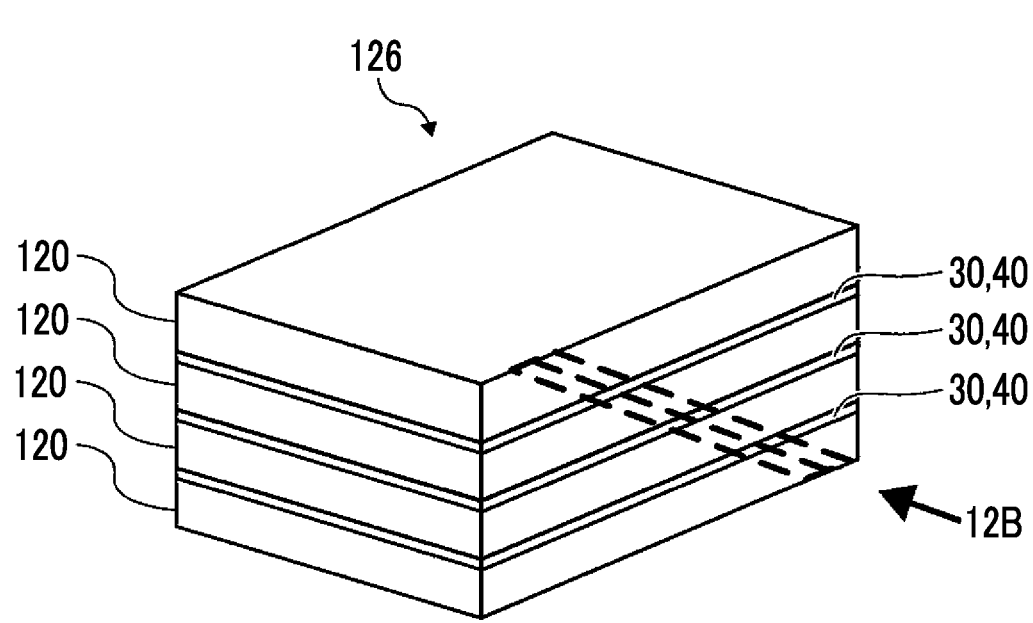
FIG. 12A shows a process of cutting out a light guide from a bonded body formed by bonding a plurality of substrates.
Figure 12B:
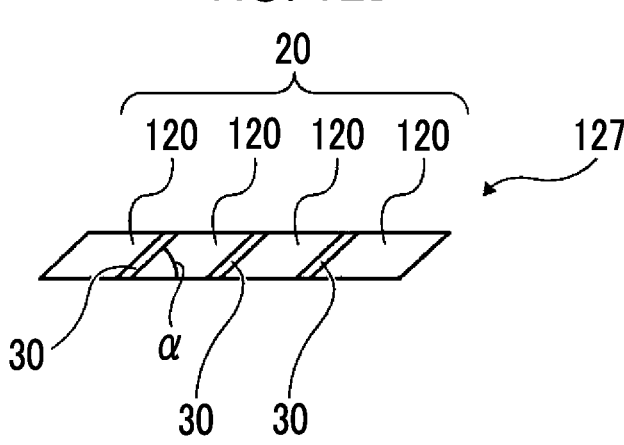
FIG. 12B is a view of the light guide cut out from the bonded body as viewed from an arrow 12B.

The light guide 12 is produced through a process of forming a dielectric multi-layer film on a plurality of substrates (see FIG. 9), a process of bonding the substrates on which the dielectric multi-layer film is formed (see FIGS. 10 and 11), and a process of cutting out a light guide from a bonded body in which the plurality of substrates are bonded (see FIGS. 12A and 12B).

Details of each process are as follows.

—Process of Forming Dielectric Multi-Layer Film—

Figure 9:
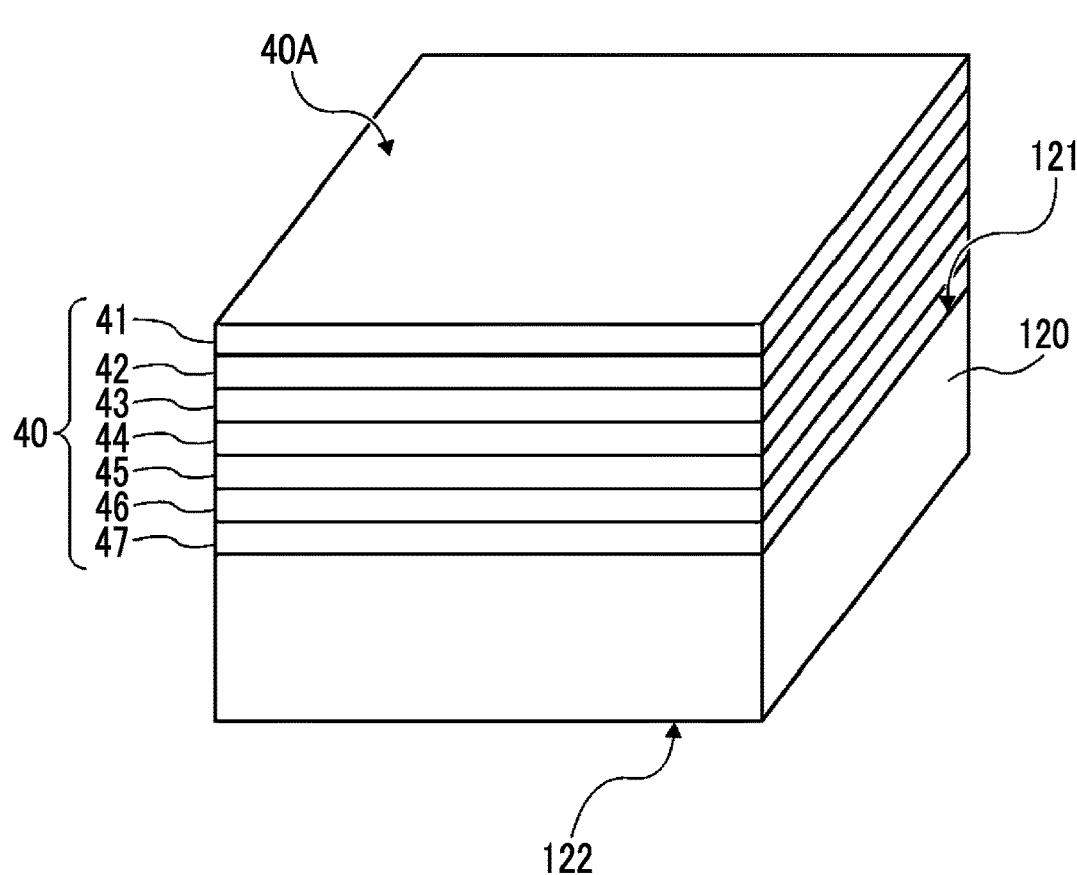
FIG. 9 is a schematic diagram showing a process of forming a dielectric multi-layer film.

A plurality of plate-shaped transparent substrates 120 are prepared, and as shown in FIG. 9, the dielectric layers 41 to 47 are sequentially formed on one surface 121 of each substrate 120 to form the dielectric multi-layer film 40. A method for forming the dielectric layers 41 to 47 is not particularly limited, but a method of forming a film in plasma, such as sputtering or a plasma chemical vapor deposition (CVD) method, is suitable.

In a case in which each of the layers 41 to 47 of the dielectric multi-layer film 40 is made of silicon oxynitride consisting of silicon, oxygen, and nitrogen, for example, each layer can be formed by a sputtering method in which an argon (Ar) gas, an oxygen gas, or a nitrogen gas is introduced into a chamber using a target. By changing a flow rate ratio of oxygen and nitrogen, an Si:O:N ratio in the film changes. Then, a refractive index of the film can be changed by changing the Si:O:N ratio. Therefore, each layer of the dielectric multi-layer film need only be formed by changing the flow rate ratio of oxygen and nitrogen so as to obtain a desired design refractive index.

Figure 8:
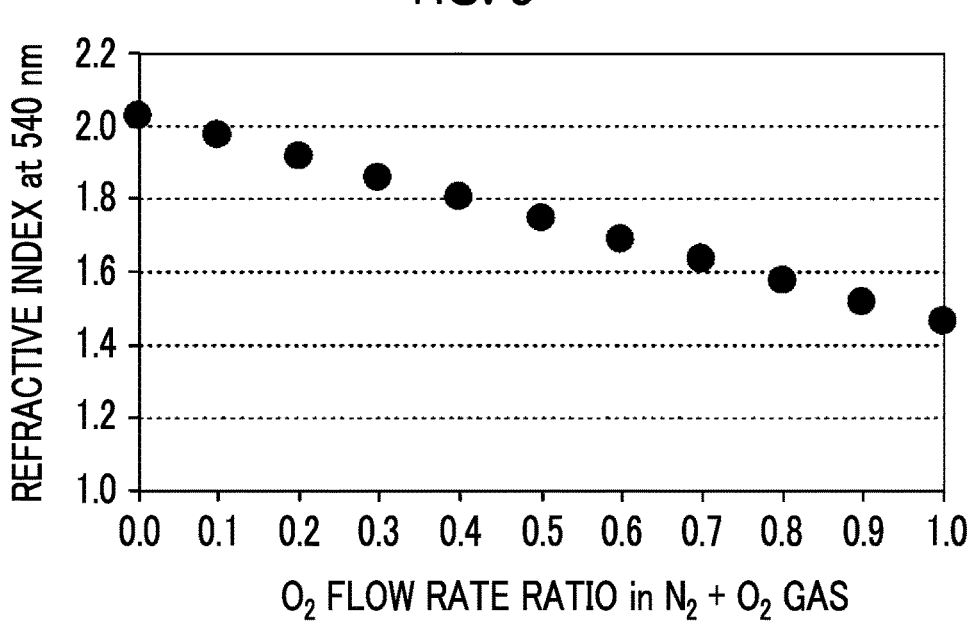
FIG. 8 is a diagram showing a nitrogen/oxygen flow rate ratio dependence of a refractive index of an oxynitride film with respect to light with a wavelength of 540 nm.

FIG. 8 shows a nitrogen/oxygen flow rate ratio dependence of a refractive index of an oxynitride film with respect to light with a wavelength of 540 nm. In the present specification, the nitrogen/oxygen flow rate ratio is shown as a ratio of oxygen in the nitrogen ($N_2$) gas+the oxygen ($O_2$) gas. From FIG. 8, it can be seen that in a case in which the nitrogen/oxygen flow rate ratio is changed, the refractive index of the film can be changed in a range from n=2.027 in a case of nitrogen:oxygen=1:0 to n=1.459 in a case of nitrogen:oxygen=0:1. Sputtering conditions for FIG. 8 are as follows: Ar gas flow rate=60 sccm, $\theta 2+N_2$ gas flow rate=60 sccm, sputtering power=750 W, target diameter=6 inches, substrate temperature (setting)=300° C., and sputtering gas pressure=0.2 Pa. In addition, the refractive index of the film was measured using Ellipsometer VASE (registered trademark) manufactured by J. A. Woollam.

In this way, a silicon oxynitride film having a desired refractive index can be obtained by changing the flow rate ratio of nitrogen:oxygen in a case of the sputtering film formation.

In a case of forming a dielectric multi-layer film, it is common to use a metal oxide with a chemical quantitative ratio. Therefore, it is necessary to design a dielectric multi-layer film using a refractive index of a metal oxide with a chemical quantitative ratio. However, as described above, since the refractive index can be changed by changing the Si:O:N ratio, a film with an optional refractive index can be formed of silicon oxynitride, and a design of a dielectric multi-layer film has a high degree of freedom.

In addition, in a case in which each of the layers 41 to 47 of the dielectric multi-layer film 40 is a metal oxide layer containing at least one of Si, Nb, Ta, Al, Ti, W, or Cr, the sputtering method can be similarly used. In co-sputtering using two or more metal targets, the refractive index can be controlled by adjusting a target voltage. In addition, the refractive index of each of the layers 41 to 47 may be controlled using a method of alternately depositing and forming films containing any of the metals with a thickness of 1/100 or less of a wavelength $\lambda$ of the video light (see, for example, JP5549342B).

—Bonding Process—

An optical contact method is suitable for bonding the plurality of substrates 120 on which the dielectric multi-layer film 40 is formed.

Figure 10:
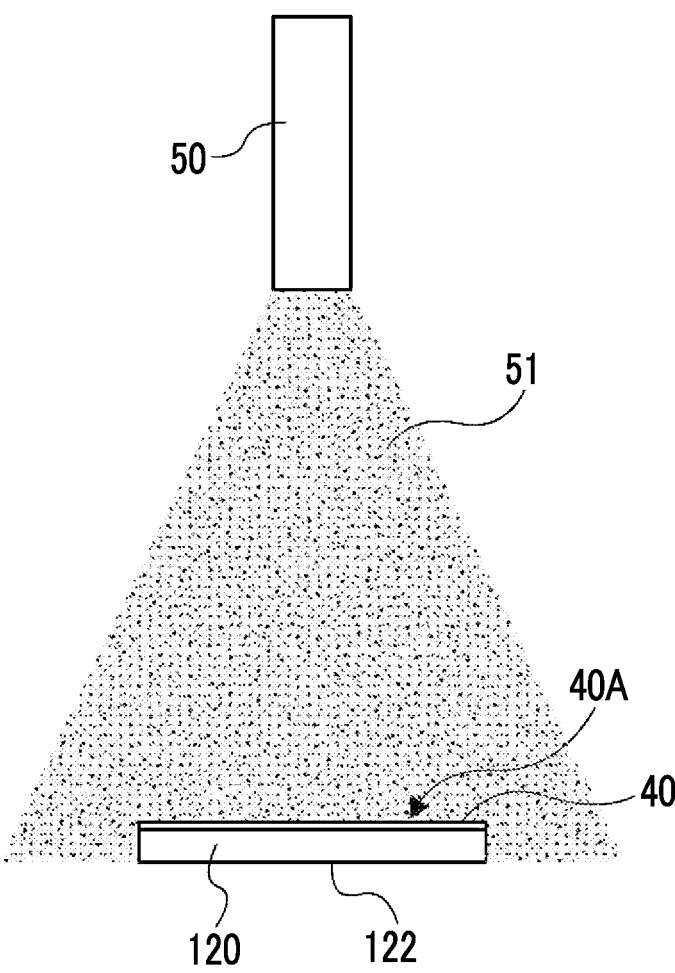
FIG. 10 is a schematic view showing a process of bonding substrates.

As shown in FIG. 10, an outermost surface 40A of the dielectric multi-layer film 40, which is provided on one surface of the plurality of substrates 120 each comprising the dielectric multi-layer film 40, and the other surface 122 of the substrate 120 on which the dielectric multi-layer film 40 is not formed (hereinafter, collectively referred to as bonding surfaces 40A and 122) are irradiated with an ion beam 51 in vacuum. An ion beam irradiation device 50 is used for irradiation of the ion beam 51. Specifically, the bonding surfaces are irradiated with argon ions as an ion beam 51 in a vacuum chamber. The irradiation of the ion beam 51 removes stains such as organic substances adhering to the bonding surfaces 40A and 122 and activates the bonding surfaces 40A and 122.

After that, as shown in S1 of FIG. 11, the substrates 120 are sequentially stacked such that the dielectric multi-layer film 40 provided on one substrate 120 and the surface 122 of the other substrate 120 on which the dielectric multi-layer film 40 is not formed face each other. In this way, as shown in S2 of FIG. 11, the activated bonding surfaces are brought into contact with each other. By stacking the substrate 120 on which the dielectric multi-layer film 40 is not provided on the top, a laminate 125 in which each dielectric multi-layer film 40 is interposed between the substrates 120 is formed.

After that, as shown in S3 of FIG. 11, the laminate 125 is held under a constant load P, for example, 500 g/cm² for a certain period of time, for example, 1 hour, to obtain a bonded body 126 (see FIGS. 12A and 12B).

After that, as shown in FIG. 12A, the bonded body 126 is cut at a cut surface that is tilted by a predetermined angle α with respect to a substrate surface, and a light guide 127 comprising the plurality of half mirrors 30 in the base 20 is cut out. In FIG. 12A, a broken line constitutes one side of the cut surface. FIG. 12B is a view of the light guide 127 cut out from the bonded body 126 as viewed from a direction of an arrow 12B of the bonded body 126 of FIG. 12A. The light guide 127 corresponds to the light guide 12 comprising the plurality of half mirrors 30 that are tilted at a tilt angle α with respect to the first reflecting surface 21 and the second reflecting surface 22 in parallel to each other. The cut surface is set according to a desired tilt angle α of the half mirror 30. The angle α is preferably, for example, about 10° to 35°.

Hereinafter, specific design examples and verification results of the dielectric multi-layer film constituting the half mirror used in the light guide according to the present disclosure will be shown. In the design examples and the verification examples, a film thickness and a wavelength dependence were obtained by simulation using commercially available thin film calculation software. In the following, the refractive index is a refractive index at a wavelength of 540 nm.

Design Example 1

Table 1 shows Design Example 1 of a dielectric multi-layer film in a case in which SF11 (manufactured by Schott Corporation) having a refractive index n=1.7934 was used as the base. In the simulation, the thickness of each layer was optimized by designing a reflectivity of 3±0.5% at an incidence angle of 25° and the lowest reflectivity at an incidence angle of 75°.

TABLE 1

| Design Example 1 Layer configuration | Refractive index at 540 nm | Extinction coefficient at 540 nm | Physical film thickness [nm] |
|---|---|---|---|
| Base (SF11) | 1.7934 | 0 | |
| 1 | 1.7950 | 0 | 212.6 |
| 2 | 1.6555 | 0 | 27.1 |
| 3 | 1.8888 | 0 | 51.0 |
| 4 | 1.6555 | 0 | 21.3 |
| 5 | 1.8888 | 0 | 80.1 |
| 6 | 1.6555 | 0 | 70.2 |
| 7 | 1.8888 | 0 | 10.0 |
| 8 | 1.6555 | 0 | 10.0 |
| 9 | 1.8888 | 0 | 97.1 |
| 10 | 1.6555 | 0 | 30.4 |
| 11 | 1.7950 | 0 | 162.6 |
| Base (SF11) | 1.7934 | 0 | |

In Design Example 1, a refractive index n1 of a layer 1 and a layer 11 as the outermost layer is 1.7950, and n1=1.0009n.

Figure 13A:
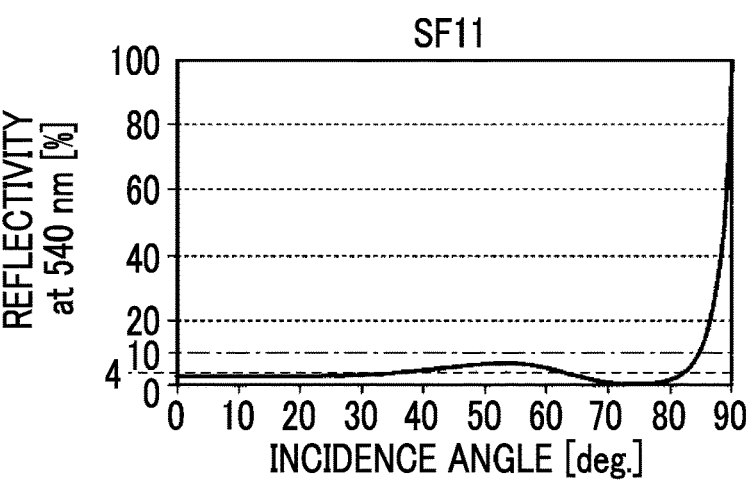
FIG. 13A is a diagram showing an incidence angle dependence of a reflectivity for light with a wavelength of 540 nm with respect to a half mirror of Design Example 1.

FIG. 13A shows an incidence angle dependence of the reflectivity for light with a wavelength of 540 nm with respect to the dielectric multi-layer film of Design Example 1. As shown in FIG. 13A, a reflectivity of 10% or less is achieved in a range of an incidence angle of 85° or less, a reflectivity of 2% to 4% is achieved in a range of an incidence angle of 0° to 38°, and a reflectivity of 4% or less is achieved in a range of an incidence angle of 63° to 82°.

Figure 13B:
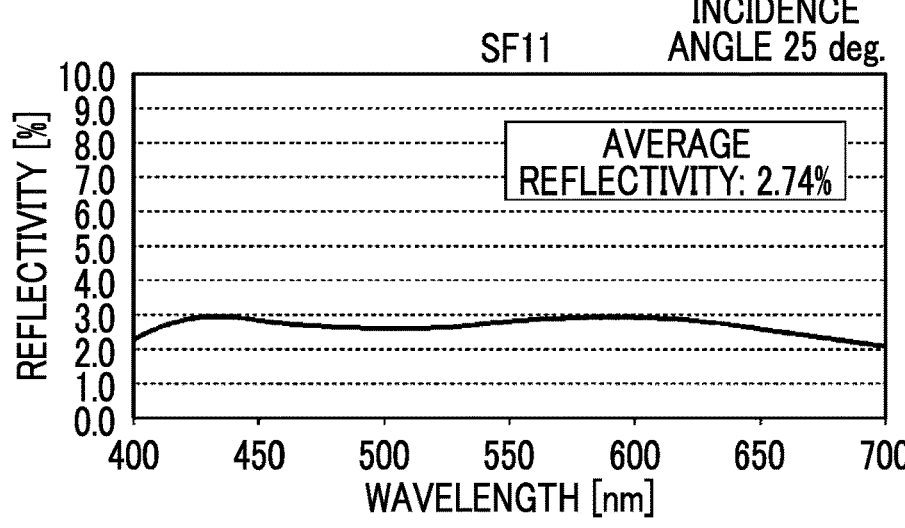
FIG. 13B is a diagram showing a wavelength dependence of a reflectivity with respect to an incidence angle of 25° for the half mirror of Design Example 1.
Figure 13C:
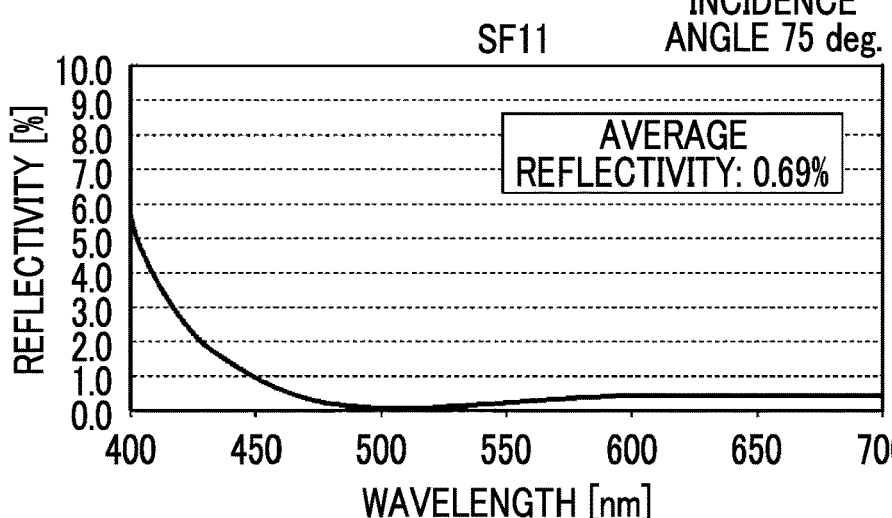
FIG. 13C is a diagram showing a wavelength dependence of a reflectivity with respect to an incidence angle of 75° for the half mirror of Design Example 1.

With respect to the dielectric multi-layer film of Design Example 1, FIG. 13B shows a wavelength dependence of a reflectivity for an incidence angle of 25°, and FIG. 13C shows a wavelength dependence of a reflectivity for an incidence angle of 75°.

As shown in FIGS. 13B and 13C, an average reflectivity at an incidence angle of 25° is 2.74% and an average reflectivity at an incidence angle of 75° is 0.69% with respect to light with a wavelength of 400 nm to 700 nm. Assuming that an incidence angle θ1 with respect to the first surface 31 is 25° and an incidence angle θ2 with respect to the second surface 32 is 75° in the half mirror 30 provided in the base 20, a video having a high contrast can be obtained with a very small reflectivity of 1% or less in a case in which video light is incident on the second surface 32.

Design Example 2

Table 2 shows Design Example 2 of a dielectric multi-layer film in a case in which S-BSM25 (manufactured by OHARA INC.) having a refractive index n=1.6621 was used as the base. In the simulation, the thickness of each layer was optimized by designing a reflectivity of 3±0.5% at an incidence angle of 25° and the lowest reflectivity at an incidence angle of 75°.

TABLE 2

| Design Example 2 Layer configuration | Refractive index at 540 nm | Extinction coefficient at 540 nm | Physical film thickness [nm] |
|---|---|---|---|
| Base (S-BSM25) | 1.6621 | 0 | |
| 1 | 1.6647 | 0 | 30.0 |
| 2 | 1.6131 | 0 | 10.0 |
| 3 | 1.9123 | 0 | 23.8 |
| 4 | 1.6131 | 0 | 164.0 |
| 5 | 1.9123 | 0 | 39.3 |
| 6 | 1.6131 | 0 | 126.0 |
| 7 | 1.9123 | 0 | 13.3 |
| 8 | 1.6131 | 0 | 71.4 |
| 9 | 1.9123 | 0 | 20.3 |
| 10 | 1.6131 | 0 | 10.0 |
| 11 | 1.6647 | 0 | 30.0 |
| Base (S-BSM25) | 1.6621 | 0 | |

In Design Example 2, a refractive index n1 of a layer 1 and a layer 11 as the outermost layer is 1.6647, and n1=1.0015n.

FIG. 14A shows an incidence angle dependence of the reflectivity for light with a wavelength of 540 nm with respect to the dielectric multi-layer film of Design Example 2. As shown in FIG. 14A, a reflectivity of 10% or less is achieved in a range of an incidence angle of 85° or less, a reflectivity of 2% to 4% is achieved in a range of an incidence angle of 0° to 36°, and a reflectivity of 4% or less is achieved in a range of an incidence angle of 60° to 83°.

With respect to the dielectric multi-layer film of Design Example 2, FIG. 14B shows a wavelength dependence of a reflectivity for an incidence angle of 25°, and FIG. 14C shows a wavelength dependence of a reflectivity for an incidence angle of 75°.

As shown in FIGS. 14B and 14C, an average reflectivity at an incidence angle of 25° is 2.90% and an average reflectivity at an incidence angle of 75° is 0.91% with respect to light with a wavelength of 400 nm to 700 nm. Assuming that an incidence angle θ1 with respect to the first surface 31 is 25° and an incidence angle θ2 with respect to the second surface 32 is 75° in the half mirror 30 provided in the base 20, a video having a high contrast can be obtained with a very small reflectivity of 1% or less in a case in which video light is incident on the second surface 32.

Design Example 3

Table 3 shows Design Example 3 of a dielectric multi-layer film in a case in which BK7 (manufactured by Schott Corporation) having a refractive index n=1.5191 was used as the base. In the simulation, the thickness of each layer was optimized by designing a reflectivity of 3±0.5% at an incidence angle of 25° and the lowest reflectivity at an incidence angle of 75°.

TABLE 3

| Design Example 3 Layer configuration | Refractive index at 540 nm | Extinction coefficient at 540 nm | Physical film thickness [nm] |
|---|---|---|---|
| Base (BK7) | 1.5191 | 0 | |
| 1 | 1.5197 | 0 | 100.7 |
| 2 | 1.7045 | 0 | 19.1 |
| 3 | 1.4832 | 0 | 196.6 |
| 4 | 1.7045 | 0 | 47.1 |
| 5 | 1.4832 | 0 | 180.3 |
| 6 | 1.7045 | 0 | 36.4 |
| 7 | 1.4832 | 0 | 113.7 |
| 8 | 1.7045 | 0 | 18.9 |
| 9 | 1.4832 | 0 | 113.5 |
| 10 | 1.7045 | 0 | 18.4 |
| 11 | 1.5197 | 0 | 60.1 |
| Base (BK7) | 1.5191 | 0 | |

In Design Example 3, a refractive index n1 of a layer 1 and a layer 11 as the outermost layer is 1.5197, and n1=1.0004n.

Figure 15A:
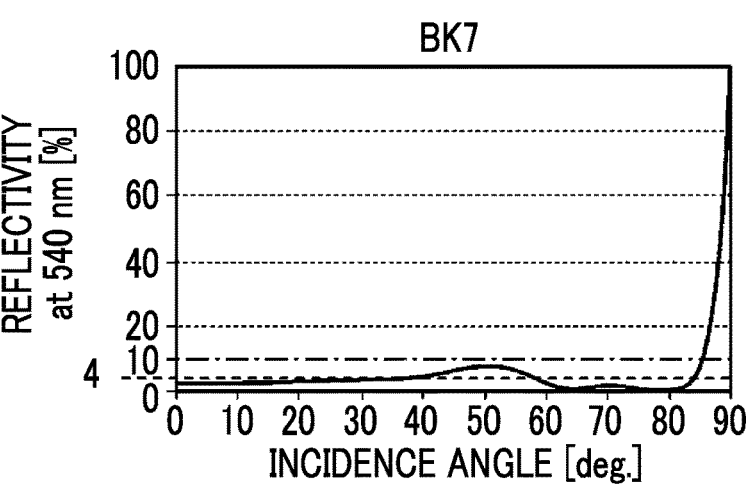
FIG. 15A is a diagram showing an incidence angle dependence of a reflectivity for light with a wavelength of 540 nm with respect to a half mirror of Design Example 3.

FIG. 15A shows an incidence angle dependence of the reflectivity for light with a wavelength of 540 nm with respect to the dielectric multi-layer film of Design Example 3. As shown in FIG. 15A, a reflectivity of 10% or less is achieved in a range of an incidence angle of 85° or less, a reflectivity of 2% to 4% is achieved in a range of an incidence angle of 0° to 38°, and a reflectivity of 4% or less is achieved in a range of an incidence angle of 58° to 83°.

Figure 15B:
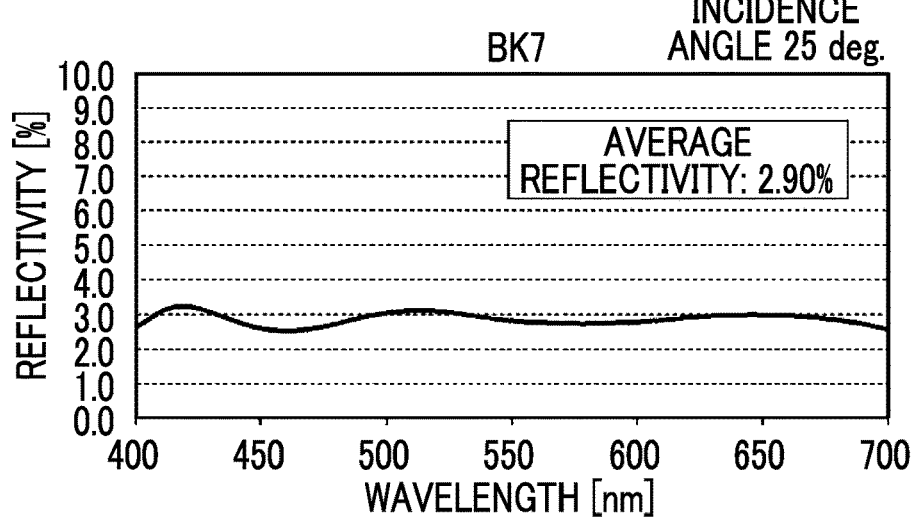
FIG. 15B is a diagram showing a wavelength dependence of a reflectivity with respect to an incidence angle of 25° for the half mirror of Design Example 3.
Figure 15C:
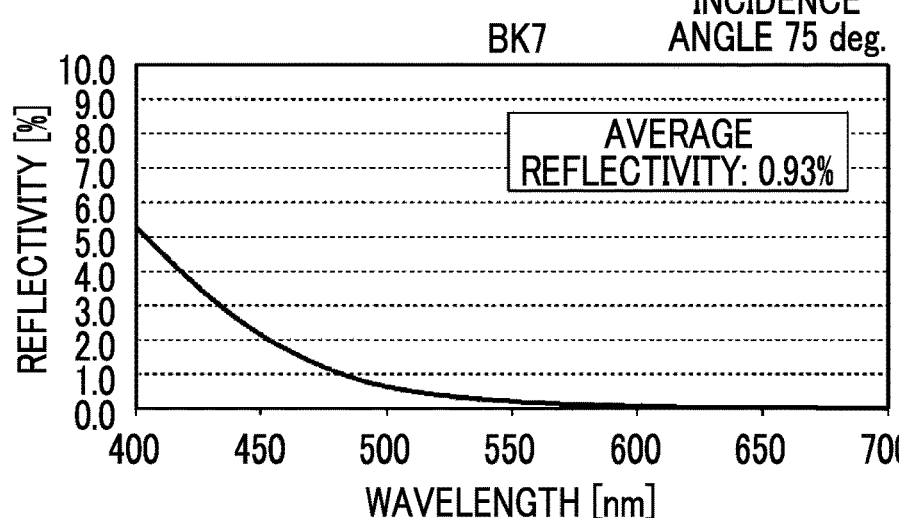
FIG. 15C is a diagram showing a wavelength dependence of a reflectivity with respect to an incidence angle of 75° for the half mirror of Design Example 3.

With respect to the dielectric multi-layer film of Design Example 3, FIG. 15B shows a wavelength dependence of a reflectivity for an incidence angle of 25°, and FIG. 15C shows a wavelength dependence of a reflectivity for an incidence angle of 75°.

As shown in FIGS. 15B and 15C, an average reflectivity at an incidence angle of 25° is 2.90% and an average reflectivity at an incidence angle of 75° is 0.93% with respect to light with a wavelength of 400 nm to 700 nm.

Results of examining an allowable range of the refractive index n1 of each outermost layer with respect to Design Examples 1 to 3 described above are shown. For Design Examples 1 to 3 described above, results obtained for an average reflectivity at an incidence angle of 25° and an average reflectivity at an incidence angle of 75° for light with a wavelength of 400 nm to 700 nm in a case in which the refractive index of the outermost layer is changed from 0.85n to 1.20n with respect to the refractive index n of the base are shown in Tables 4 to 6, respectively. In the simulation, for each of Design Examples 1 to 3, only the refractive index of the outermost layer was changed, the refractive index of the layers 2 to 10 was not changed, and the reflectivity at an incidence angle of 25° was set to 3±0.5% as a target value, and, in this case, the reflectivity at 75° was optimized to be as small as possible.

Table 4 shows the results in a case in which the base (SF11) having a refractive index n=1.7934 of Design Example 1 was used.

TABLE 4

| Incidence angle | Refractive index n1 | | | | | | | |
|---|---|---|---|---|---|---|---|---|
| | 0.85n | 0.90n | 0.95n | 1.00n | 1.05n | 1.10n | 1.15n | 1.20n |
| 25° | 2.70 | 2.73 | 2.86 | 2.74 | 2.76 | 2.80 | 2.85 | 2.91 |
| 75° | 8.45 | 1.46 | 2.77 | 0.69 | 1.02 | 1.14 | 2.05 | 2.49 |

In this example, in a range of n1=0.90n to 1.20n, the average reflectivity at the incidence angle of 25° was in a range of 3±0.5%, and the average reflectivity at the incidence angle of 75° was 3% or less. In addition, the average reflectivity at the incidence angle of 75° with n1=1.00n could be set to 1% or less.

Table 5 shows the results in a case in which the base (S-BSM25) having a refractive index n=1.6621 of Design Example 2 was used.

TABLE 5

| Incidence angle | Refractive index n1 | | | | | | | |
|---|---|---|---|---|---|---|---|---|
| | 0.85n | 0.90n | 0.95n | 1.00n | 1.05n | 1.10n | 1.15n | 1.20n |
| 25° | — | 2.79 | 2.61 | 2.90 | 2.81 | 2.81 | 2.89 | 2.98 |
| 75° | — | 2.10 | 0.77 | 0.91 | 0.42 | 1.60 | 2.25 | 5.12 |

In this example, in a range of n1=0.90n to 1.15n, the average reflectivity at the incidence angle of 25° was in a range of 3±0.5%, and the average reflectivity at the incidence angle of 75° was 3% or less. In addition, in a range of n1=0.95n to 1.05n, the average reflectivity at the incidence angle of 75° could be set to 1% or less.

Table 6 shows the results in a case in which the base (BK7) having a refractive index n=1.5191 of Design Example 3 was used.

TABLE 6

| Incidence angle | Refractive index n1 | | | | | | |
|---|---|---|---|---|---|---|---|
| | 0.85n | 0.90n | 1.00n | 1.05n | 1.10n | 1.15n | 1.20n |
| 25° | — | 2.79 | 2.90 | 2.89 | 2.90 | 2.90 | 3.00 |
| 75° | — | 2.72 | 0.93 | 1.58 | 0.76 | 2.20 | 4.78 |

In this example, in a range of n1=0.90n to 1.15n, the average reflectivity at the incidence angle of 25° was in a range of 3±0.5%, and the average reflectivity at the incidence angle of 75° was 3% or less. In addition, in a range of n1=1.00n to 1.10n, the average reflectivity at the incidence angle of 75° could be set to 2% or less.

In Design Examples 2 and 3, in a case in which the refractive index of the outermost layer was set to 0.85n, no solution was obtained, so the calculation was not performed.

From the above results, it is clear that the average reflectivity at the incidence angle of 75° can be suppressed to 3% or less in a case in which the refractive index of the outermost layer is in a range of 0.9n to 1.15n, regardless of which base is used, from low to high refractive index. The refractive index of the outermost layer is preferably 0.95n to 1.10n, and more preferably 1.00n to 1.05n. A still more preferable range of the refractive index of the outermost layer varies slightly depending on the refractive index of the base.

Verification Example

Next, with respect to a case in which the thickness d of the outermost layer of the dielectric multi-layer film was set to 30 nm, 50 nm, or 100 nm in Design Examples 1 to 3, a $\Delta n$ dependence, which is represented by the refractive index $n1$ of the outermost layer and the refractive index $n$ of the base, of an average reflectivity in a case in which light with a wavelength of 400 nm to 700 nm was incident at the incidence angle of 75° (hereafter, simply referred to as an average reflectivity (75°) was examined. Here, $\Delta n$ [%]={ $(n-n1)/n$}·100. In the simulation, in film configurations of Design Examples 1 to 3, the thickness of the outermost layer (layer 1 and layer 11) was fixed and the thicknesses of the other layers 2 to 10 were optimized such that the reflectivity at the incidence angle of 25° was 3±0.5% and the reflectivity at the incidence angle of 75° was the lowest. The results are shown in FIGS. 16A to 18B.

Figure 16A:
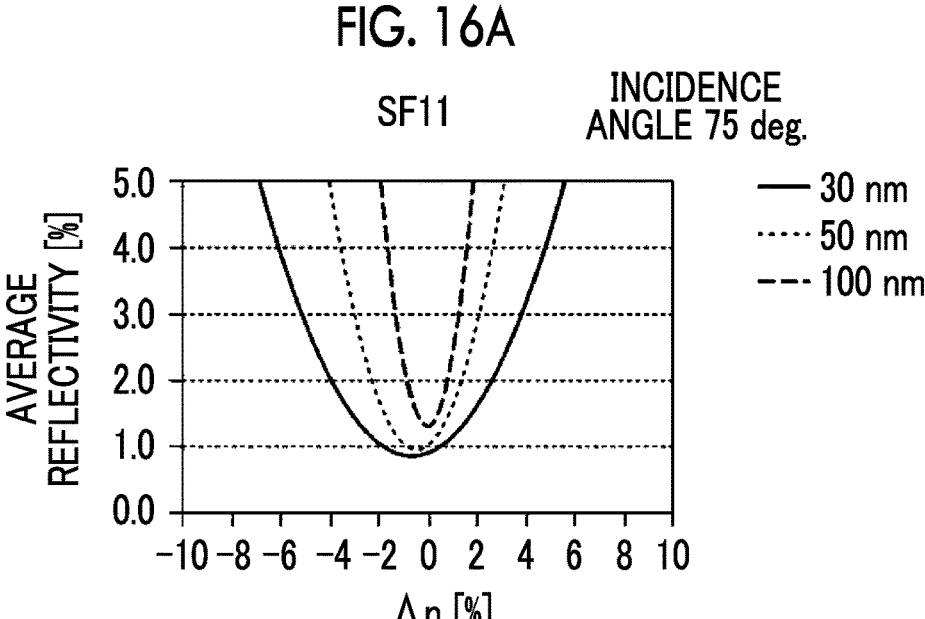
FIG. 16A shows a Δn dependence of the reflectivity with respect to the incidence angle of 75° for the half mirror of Design Example 1.
Figure 16B:
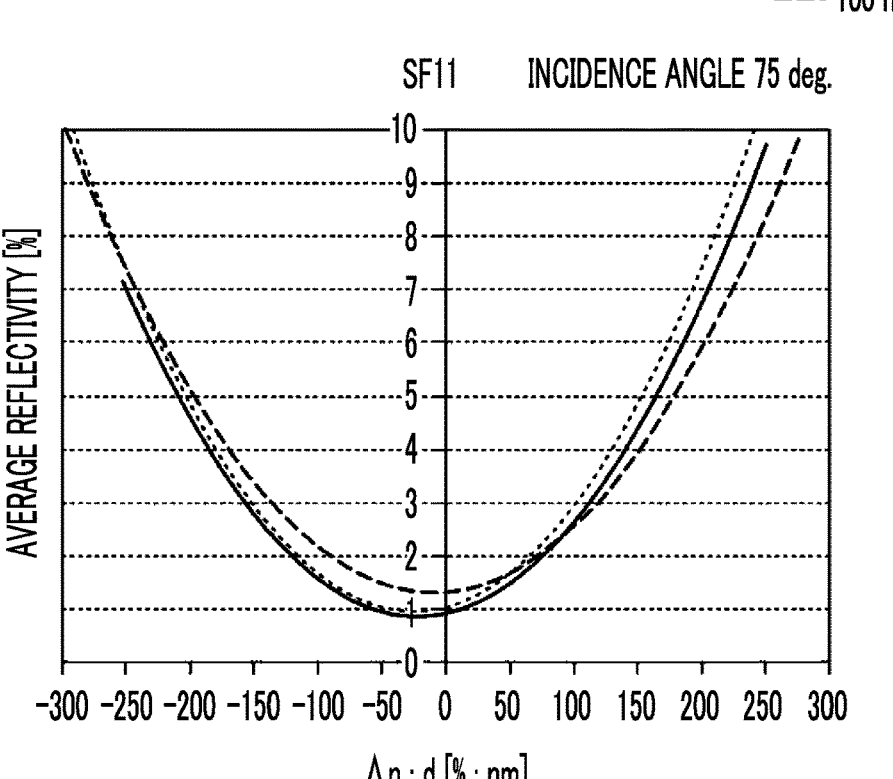
FIG. 16B shows a Δn·d dependence of a reflectivity with respect to light incident at an incidence angle of 75° for the half mirror of Design Example 1.

FIGS. 16A and 16B show the results in a case in which the base (SF11) having a refractive index n=1.7950 of Design Example 1 was used. FIG. 16A shows the $\Delta n$ dependence of the average reflectivity (75°), and FIG. 16B shows a $\Delta n \cdot d$ dependence of the average reflectivity with respect to light incident at the incidence angle of 75°. As shown in FIG. 16A, there is a minimum value in a range of –1 to 0 for $\Delta n$ [%] in all of 30 nm, 50 nm, and 100 nm. As shown in FIG. 16B, it can be seen that in a case in which a horizontal axis is $\Delta n \cdot d$, regardless of the thickness of the outermost layer, the average reflectivity (75°) can be set to approximately 10% or less in a case in which $\Delta n \cdot d$ [%·nm] is –300 to +300, the average reflectivity (75°) can be set to approximately 4% or less in a case in which $\Delta n \cdot d$ [%·nm] is –150 to +150, and the average reflectivity (75°) can be set to approximately 2% or less in a case in which $\Delta n \cdot d$ [%·nm] is –100 to +100.

Figure 17A:
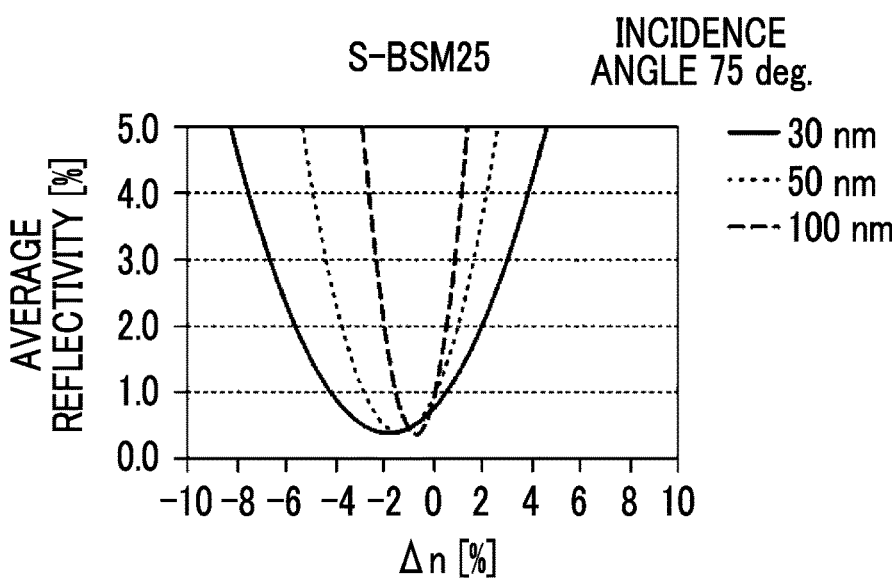
FIG. 17A shows a Δn dependence of the reflectivity with respect to the incidence angle of 75° for the half mirror of Design Example 2.
Figure 17B:
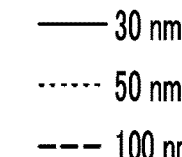
FIG. 17B shows a Δn·d dependence of a reflectivity with respect to light incident at an incidence angle of 75° for the half mirror of Design Example 2.
Figure 17B:
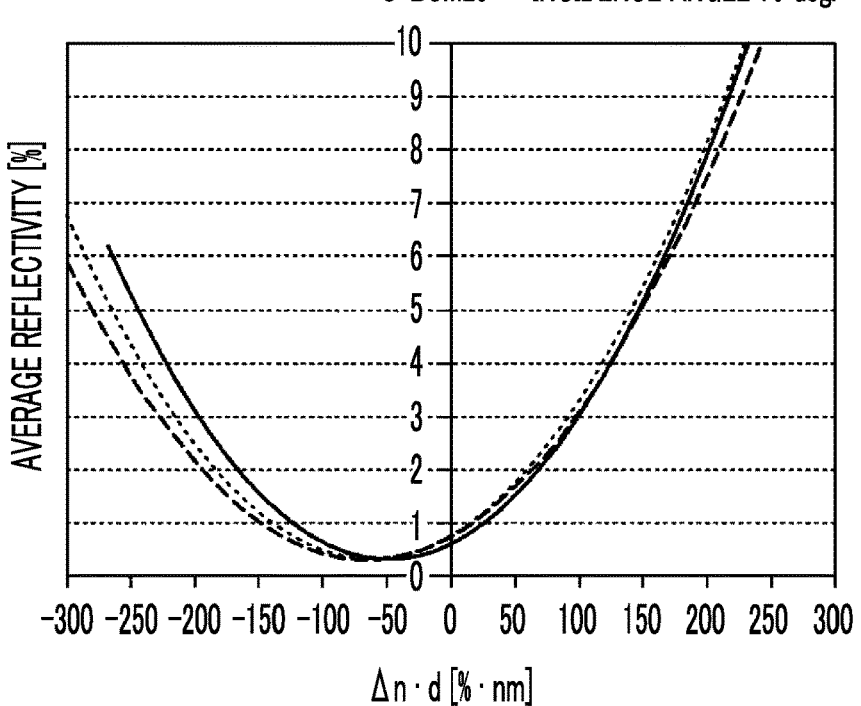

FIGS. 17A and 17B show the results in a case in which the base (S-BSM25) having a refractive index n=1.6621 of Design Example 2 was used. FIG. 17A shows the $\Delta n$ dependence of the average reflectivity (75°), and FIG. 17B shows a $\Delta n \cdot d$ dependence of the average reflectivity with respect to light incident at the incidence angle of 75°. As shown in FIG. 17A, there is a minimum value in a range of –2 to 0.5 for $\Delta n$ [%] in all of 30 nm, 50 nm, and 100 nm. As shown in FIG. 17B, it can be seen that in a case in which a horizontal axis is $\Delta n \cdot d$, regardless of the thickness of the outermost layer, the average reflectivity (75°) can be set to approximately 10% or less in a case in which $\Delta n \cdot d$ [%·nm] is –300 to +300, the average reflectivity (75°) can be set to approximately 4% or less in a case in which $\Delta n \cdot d$ [%·nm] is –200 to +150, and the average reflectivity (75°) can be set to approximately 3% or less in a case in which $\Delta n \cdot d$ [%·nm] is –150 to +100. Further, in a case in which $\Delta n \cdot d$ [%·nm] is –125 to +25, the average reflectivity (75°) can be set to approximately 1% or less.

Figure 18A:
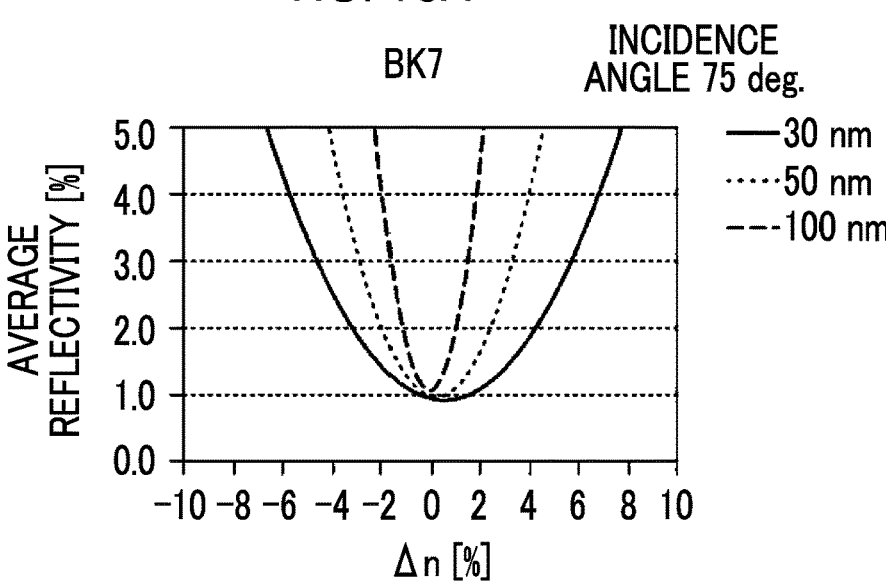
FIG. 18A shows a Δn dependence of the reflectivity with respect to the incidence angle of 75° for the half mirror of Design Example 3.
Figure 18B:
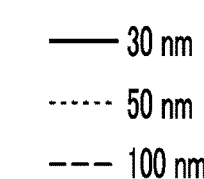
FIG. 18B shows a Δn·d dependence of a reflectivity with respect to light incident at an incidence angle of 75° for the half mirror of Design Example 3.
Figure 18B:
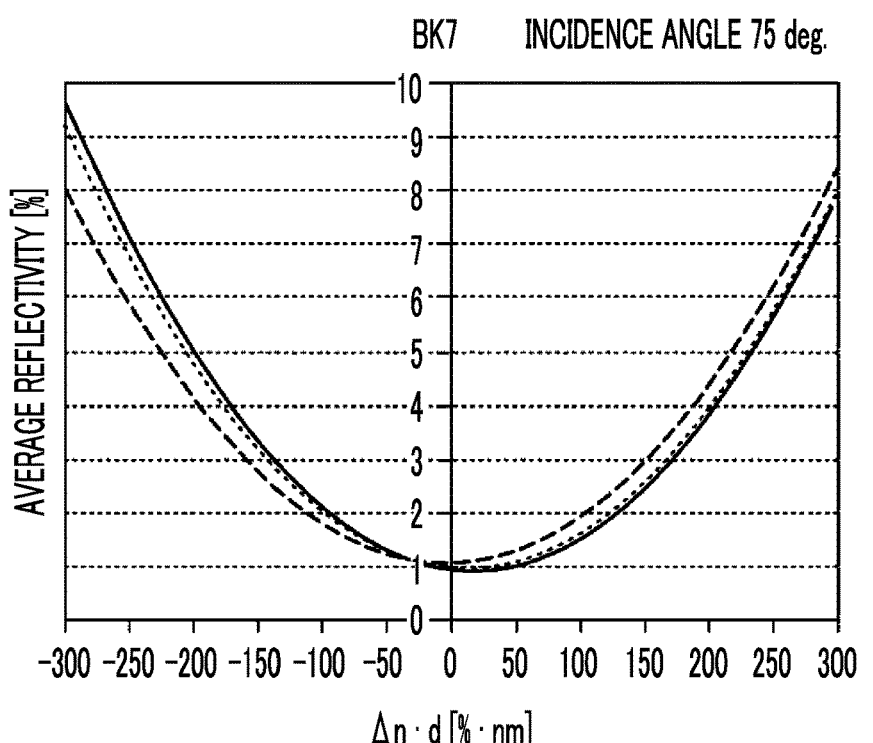

FIGS. 18A and 18B show the results in a case in which the base (BK7) having a refractive index n=1.5191 of Design Example 3 was used. FIG. 18A shows the $\Delta n$ dependence of the average reflectivity (75°), and FIG. 18B shows a $\Delta n \cdot d$ dependence of the average reflectivity with respect to light incident at the incidence angle of 75°. As shown in FIG. 18A, there is a minimum value in a range of –1 to +1 for $\Delta n$ [%] in all of 30 nm, 50 nm, and 100 nm. As shown in FIG. 18B, it can be seen that in a case in which a horizontal axis is $\Delta n \cdot d$, regardless of the thickness of the outermost layer, the average reflectivity (75°) can be set to approximately 10% or less in a case in which $\Delta n \cdot d$ [%·nm] is –300 to +300, the average reflectivity (75°) can be set to approximately 4% or less in a case in which $\Delta n \cdot d$ [%·nm] is –200 to +200, and the average reflectivity (75°) can be set to approximately 2% or less in a case in which $\Delta n \cdot d$ [%·nm] is –100 to +100.

From the above results, it is possible to set the average reflectivity (75°) to 10% or less by setting $\Delta n \cdot d$ [%·nm] to be approximately –300 to +300, to set the average reflectivity (75°) to 4% or less by setting $\Delta n \cdot d$ [%·nm] to be approximately –200 to +200, and to set the average reflectivity (75°) to 4% or less by setting $\Delta n \cdot d$ [%·nm] to be approximately –150 to +150 without selecting the refractive index of the base.

Design Example 4

Table 7 shows Design Example 4 of a dielectric multi-layer film in a case in which S-LAH79 (manufactured by OHARA INC.) having a refractive index n=2.01339 was used as the base.

TABLE 7

| Design Example 4 Layer configuration | Refractive index at 540 nm | Extinction coefficient at 540 nm | Physical film thickness [nm] |
|---|---|---|---|
| Base (S-LAH79) | 2.01339 | 0 | |
| 1 | 2.03153 | 0 | 145.31 |
| 2 | 1.96414 | 0 | 120.09 |
| 3 | 2.12386 | 0 | 86.51 |
| 4 | 1.96414 | 0 | 112.35 |
| 5 | 2.12386 | 0 | 55.27 |
| 6 | 1.96413 | 0 | 84.89 |
| 7 | 2.12386 | 0 | 63.74 |
| 8 | 1.96414 | 0 | 59.24 |
| 9 | 2.12386 | 0 | 28.81 |
| 10 | 1.96414 | 0 | 73.00 |
| 11 | 2.03153 | 0 | 126.15 |
| Base (S-LAH79) | 2.01339 | 0 | |

In Design Example 4, a refractive index $n1$ of a layer 1 and a layer 11 as the outermost layer is 2.03153, and $n1=1.00901n$. In a case in which the half mirror comprising the dielectric multi-layer film of Design Example 4 is disposed in the base at a tilt angle of 25°, the refractive index of the base is high, so that the video light propagates in the base by repeated total reflection even though the video light is incident on the dielectric multi-layer film at an incidence angle $\theta 1=5°$.

In addition, for the dielectric multi-layer films of Design Examples 1 to 4, a case in which refractive index of a first layer and an eleventh layer, which are the outermost layers, is the same as the refractive index n of the base is referred to as Design Examples 1A to 4A, and, from the incidence angle dependence of the average reflectivity for the light with a wavelength of 400 nm to 700 nm in each example, a preferred incidence angle range of the video light with respect to the first surface and the second surface of the half mirror was verified.

For the half mirror of each of Design Examples 1A to 4A, the average reflectivity with respect to the light with a wavelength of 400 nm to 700 nm at each of incidence angles θ1 and θ2 in a range of the incidence angle θ1=5° to 35° and the incidence angle θ2=55° to 85° was evaluated according to the following criteria. The results are shown in Table 8.

—Evaluation of Incidence Angle θ1—

A: Average reflectivity is more than 3% and 4% or less.

B: Average reflectivity is more than 2% and 3% or less.

C: Average reflectivity is more than 1% and 2% or less.

D: Average reflectivity is more than 4%.

—Evaluation of Incidence Angle θ2—

A: Average reflectivity is 1% or less.

B: Average reflectivity is more than 1% and 3% or less.

C: Average reflectivity is more than 3% and 4% or less.

D: Average reflectivity is more than 4% and 10% or less.

E: Average reflectivity is more than 10%.

TABLE 8

| | Refractive index | Incidence angle θ1 [deg.] | | | | | | | Incidence angle θ2 [deg.] | | | | | | |
|---|---|---|---|---|---|---|---|---|---|---|---|---|---|---|---|
| | n of base | 5 | 10 | 15 | 20 | 25 | 30 | 35 | 55 | 60 | 65 | 70 | 75 | 80 | 85 |
| Design Example 1A | 1.7934 | B | B | B | B | B | B | A | D | D | D | B | A | B | D |
| Design Example 2A | 1.6621 | B | B | B | B | B | A | A | D | D | C | B | A | B | D |
| Design Example 3A | 1.5191 | B | B | B | B | B | A | A | D | D | B | B | A | A | D |
| Design Example 4A | 2.0315 | B | B | B | B | B | B | A | D | D | D | D | D | C | D |

As the incidence angle θ1, a good average reflectivity of more than 2% and 4% or less was obtained in a range of 5° to 35°. On the other hand, as the incidence angle θ2, an average reflectivity of 10% or less could be obtained in a range of 55° to 85°, and in Design Examples 1A to 3A, an average reflectivity of 4% or less could be obtained in a range of 70° to 80°. It is preferable to set the tilt angle α and the optical coupling angle θ0 of the half mirror such that the incidence angle θ1 is 5° to 35° and the incidence angle θ2 is 55° to 85°. Since the average reflectivity can be 4% or less, the incidence angle θ2 is more preferably 70° to 80°. In a real system, the incidence angle θ1 is preferably 10° or more because of the constraints on the configuration.

Here, a sensory evaluation was made on a state of a light-dark pattern of a video in a case in which the reflectivity with respect to the light incident on the second surface of the half mirror in the light guide was changed. In the present specification, the light-dark pattern of the video means a light-dark pattern based on a light amount intensity distribution that appears in a video visually recognized through the light guide. It is considered that this light-dark pattern is generated by an interference between the video light and the stray light. An ideal high-contrast image is obtained in a case in which no light-dark pattern appears, and the higher the degree of visibility of the light-dark pattern is, the lower the contrast of the image is.

"Sensory Evaluation Test"

Alight guide comprising six half mirrors made of the dielectric multi-layer film shown in Design Example 1 was produced (a production method thereof will be described below). In the half mirror of Design Example 1, the average reflectivity can be changed from 10% to 1% or less by changing the incidence angle of the second surface in a range of 55° to 85°. In addition, as an example in which the average reflectivity of the second surface exceeds 10%, a light guide comprising six half mirrors made of the dielectric multi-layer film of Comparative Example 1 below was produced. For the light guide comprising the half mirror of Design Example 1, a sensory evaluation was made on the degree of the light-dark pattern due to the interference between the video light and the stray light in a case in which the incidence angle on the first surface was changed such that the incidence angle on the second surface of the half mirror is 55° to 85° and the average reflectivity of the second surface was set to 1% or less to 10%. In addition, for the light guide comprising the half mirror of Comparative Example 1, the same sensory evaluation was made for a case in which the incidence angle on the first surface was set such that the incidence angle on the second surface of the half mirror is 75°, and the average reflectivity of the second surface exceeded 10%.

Comparative Example 1

Table 9 shows a layer configuration of Comparative Example 1 of a dielectric multi-layer film in a case in which SF11 (manufactured by Schott Corporation) having a refractive index n=1.7934 was used as the base. A refractive index n1 of a first layer and an eleventh layer, which are two outermost layers of the dielectric multi-layer film, was set to 0.83n, which is a value outside a range of 0.9n to 1.15n. In the simulation, the thickness of each layer was optimized by designing a reflectivity of 3±0.5% at an incidence angle of 25° and the lowest reflectivity at an incidence angle of 75°.

TABLE 9

| Comparative Example 1 Layer configuration | Refractive index at 540 nm | Film thickness [nm] |
|---|---|---|
| Base (SF11) | 1.79340 | |
| 1 | 1.48664 | 30.00 |
| 2 | 2.12201 | 32.36 |
| 3 | 1.74030 | 62.05 |
| 4 | 2.12201 | 26.76 |
| 5 | 1.74030 | 131.34 |
| 6 | 2.12201 | 10.43 |
| 7 | 1.74030 | 10.00 |
| 8 | 2.12201 | 10.00 |
| 9 | 1.74030 | 25.81 |
| 10 | 2.12201 | 32.62 |
| 11 | 1.48664 | 30.00 |
| Base (SF11) | 1.79340 | |

For the half mirror of Comparative Example 1, the average reflectivity with respect to the light with a wavelength of 400 nm to 700 nm at each of incidence angles θ1 and θ2 in a range of the incidence angle θ1=5° to 35° and the incidence angle θ2=55° to 85° is shown in Table 10.

TABLE 10

| | Comparative Example 1 | | | | | | | | | | | | |
| | Incidence angle $\theta 1$ | | | | | | | | Incidence angle $\theta 2$ | | | | |
| | | | | | | Incidence angle [deg.] | | | | | | | |
| | 5 | 10 | 15 | 20 | 25 | 30 | 35 | 55 | 60 | 65 | 70 | 75 | 80 | 85 |
| Reflectivity [%] | 3.23 | 3.05 | 2.83 | 2.65 | 2.64 | 2.88 | 3.34 | 8.12 | 9.61 | 9.22 | 8.80 | 10.42 | 13.58 | 40.70 |

In Comparative Example 1, the average reflectivity with respect to the light with a wavelength of 400 nm to 700 nm that is incident in a range of the incidence angle $\theta 2=75°$ to 85° exceeds 10%.

As shown in Table 10, in Comparative Example 1, as the incidence angle $\theta 1$, a good reflectivity of more than 2% and 4% or less can be obtained in a range of 5° to 35°. On the other hand, in a case in which the light is incident at the incidence angle $\theta 2$ of 75° or more, the average reflectivity with respect to the light with a wavelength of 400 nm to 700 nm exceeds 10%.

Table 11 shows results of the sensory evaluation in a case in which the average reflectivity of the half mirror to the second surface (second surface reflectivity in Table 11) was changed from 1% or less to more than 10%.

TABLE 11

| Second surface reflectivity | Light-dark pattern of video |
|---|---|
| More than 10% | Light-dark pattern of video was clearly visible |
| 10% or less and more than 8% | Light-dark pattern of video was slightly clearly visible |
| 8% or less and more than 4% | Light-dark pattern of video was faintly visible |
| 4% or less and more than 3% | Light-dark pattern of video was quite faintly visible |
| 3% or less and more than 1% | Light-dark pattern of video was hardly visible |
| 1% or less | Light-dark pattern of video was not visible |

As shown in Table 11, results were obtained that in a case in which the average reflectivity of the second surface of the half mirror exceeds 10%, the light-dark pattern is clearly visible, but in a case in which the average reflectivity is 10% or less, the appearance of the light-dark pattern is somewhat suppressed. From the results of the sensory evaluation, it can be said that the average reflectivity of the half mirror on the second surface is preferably 10% or less, more preferably 4% or less, still more preferably 3% or less, and still more preferably 1% or less.

Hereinafter, an example of a multi-layer film constituting the half mirror in which the average reflectivity with respect to the light with a wavelength of 400 nm to 700 nm that is incident at an incidence angle of 5° to 35° is 2% to 4%, and the average reflectivity with respect to the light incident at an incidence angle of 55° to 85° is 10% or less is shown as Reference Examples 1 to 3.

Reference Example 1

Table 12 shows a layer configuration of Reference Example 1 of a dielectric multi-layer film in a case in which SF11 (manufactured by Schott Corporation) having a refractive index n=1.7934 was used as the base. A refractive index n1 of a first layer of two outermost layers of the dielectric multi-layer film was set in a range of 0.9n to 1.15n of the refractive index n of the base, and a refractive index n1 of an eleventh layer was set outside the range of 0.9n to 1.15n. In the simulation, the thickness of each layer was optimized by setting a target value of the reflectivity at the incidence angle of 25° to 3±0.5% and designing the reflectivity at the incidence angle of 75° to have a lowest value.

TABLE 12

| Reference Example 1 Layer configuration | Refractive index at 540 nm | Film thickness [nm] |
|---|---|---|
| Base (SF11) | 1.7934 | |
| 1 | 1.7950 | 96.8 |
| 2 | 1.7543 | 53.7 |
| 3 | 2.1208 | 11.1 |
| 4 | 1.7543 | 63.9 |
| 5 | 2.1208 | 16.3 |
| 6 | 1.7543 | 158.5 |
| 7 | 2.1208 | 10.0 |
| 8 | 1.7543 | 23.8 |
| 9 | 2.1208 | 33.3 |
| 10 | 1.7543 | 10.0 |
| 11 | 1.4910 | 30.0 |
| Base (SF11) | 1.7934 | |

Figure 19A:
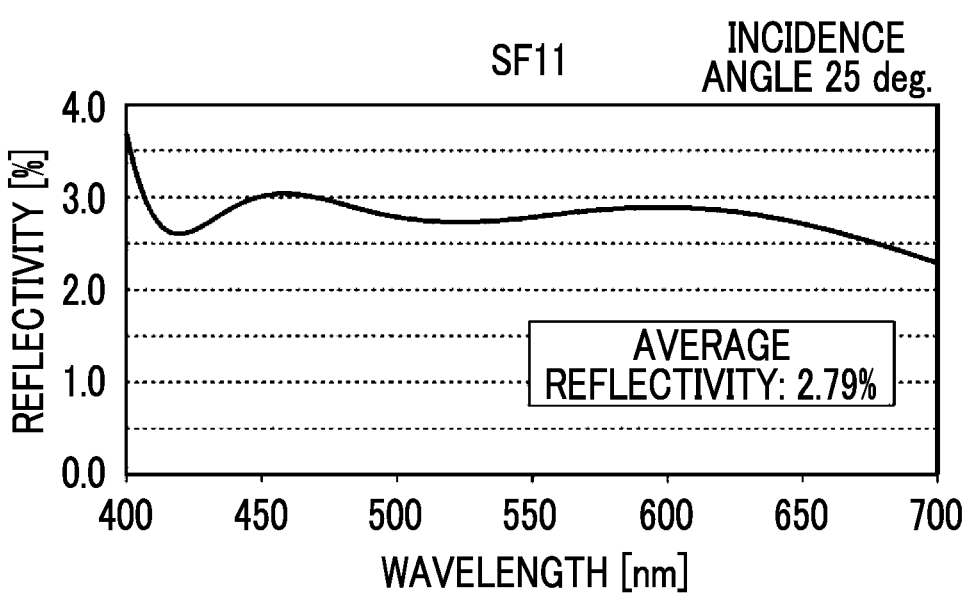
FIG. 19A is a diagram showing a wavelength dependence of a reflectivity with respect to an incidence angle of 25° for a half mirror of Reference Example 1.
Figure 19B:
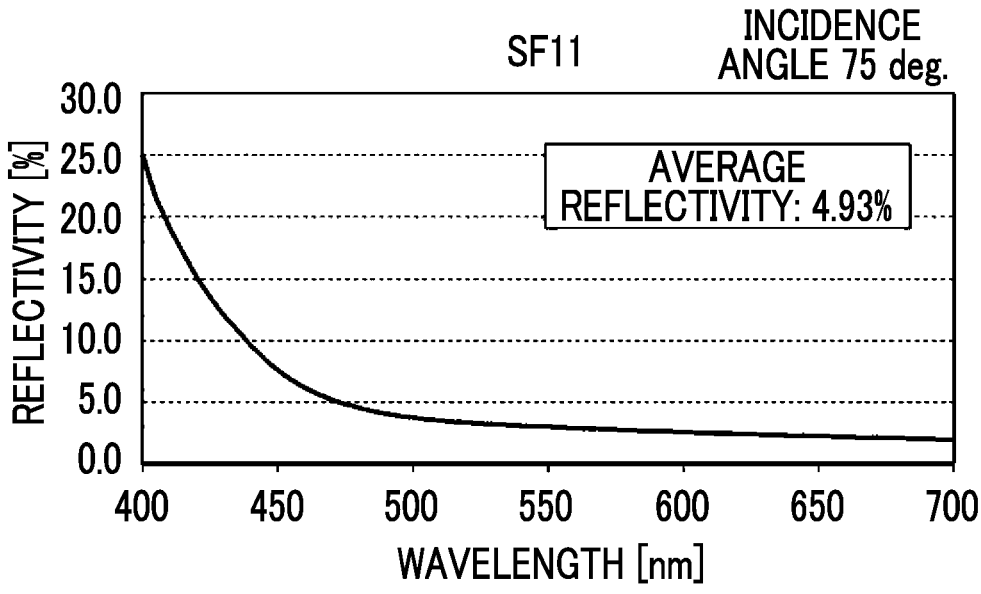
FIG. 19B is a diagram showing a wavelength dependence of a reflectivity with respect to an incidence angle of 75° for the half mirror of Reference Example 1.

With respect to the dielectric multi-layer film of Reference Example 1, FIG. 19A shows a wavelength dependence of a reflectivity for an incidence angle of 25°, and FIG. 19B shows a wavelength dependence of a reflectivity for an incidence angle of 75°.

As shown in FIGS. 19A and 19B, an average reflectivity at an incidence angle of 25° is 2.79% and an average reflectivity at an incidence angle of 75° is 4.93% with respect to light with a wavelength of 400 nm to 700 nm. Assuming that an incidence angle $\theta 1$ with respect to the first surface 31 is 25° and an incidence angle $\theta 2$ with respect to the second surface 32 is 75° in the half mirror 30 provided in the base 20, the average reflectivity in a case in which video light is incident on the second surface 32 exceeds 4%, and the average reflectivity increases as compared with Design Examples 1 to 3. However, since the average reflectivity in a case in which the video light is incident on the second surface is 10% or less, it is possible to obtain an effect of suppressing the light-dark pattern appearing due to interference between the stray light and the video light, that is, an effect of improving the contrast of the video can be obtained.

Reference Example 2

Table 13 shows a layer configuration of Reference Example 2 of a dielectric multi-layer film in a case in which S-BSM25 (manufactured by OHARA INC.) having a refractive index n=1.6621 was used as the base. A refractive index n1 of a first layer of two outermost layers of the dielectric multi-layer film was set in a range of 0.9n to 1.15n of the refractive index n of the base, and a refractive index n1 of an eleventh layer was set outside the range of 0.9n to 1.15n. In the simulation, the thickness of each layer was optimized by setting a target value of the reflectivity at the incidence angle of 25° to 3±0.5% and designing the reflectivity at the incidence angle of 75° to have a lowest value.

TABLE 13

| Reference Example 2 Layer configuration | Refractive index at 540 nm | Film thickness [nm] |
|---|---|---|
| Base (S-BSM25) | 1.6621 | |
| 1 | 1.6647 | 30.0 |
| 2 | 1.5761 | 10.0 |
| 3 | 1.7907 | 10.0 |
| 4 | 1.5761 | 73.4 |
| 5 | 1.7907 | 10.0 |
| 6 | 1.5761 | 10.0 |
| 7 | 1.7907 | 70.4 |
| 8 | 1.5761 | 10.0 |
| 9 | 1.7907 | 10.0 |
| 10 | 1.5761 | 13.7 |
| 11 | 1.4910 | 30.0 |
| Base (S-BSM25) | 1.6621 | |

Figure 20A:
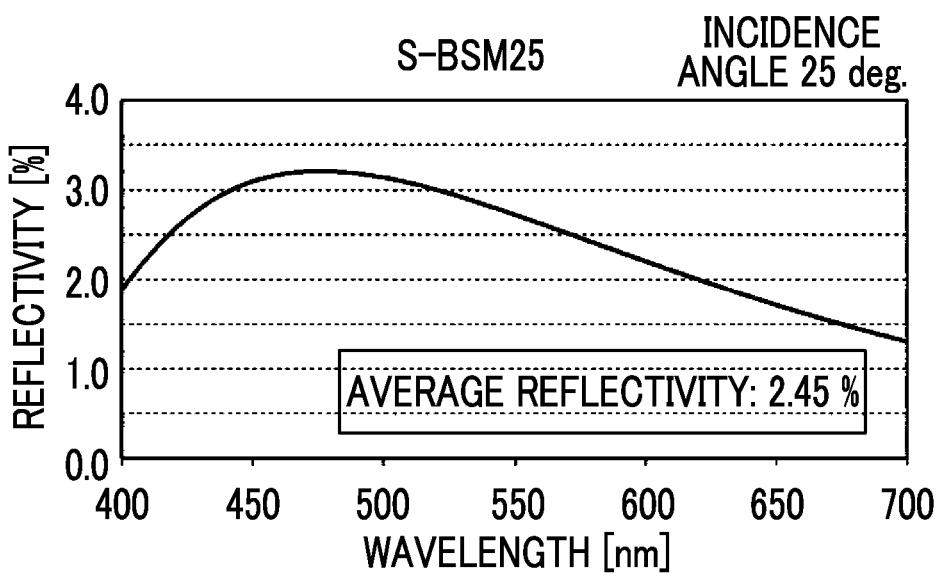
FIG. 20A is a diagram showing a wavelength dependence of a reflectivity with respect to an incidence angle of 25° for a half mirror of Reference Example 2.
Figure 20B:
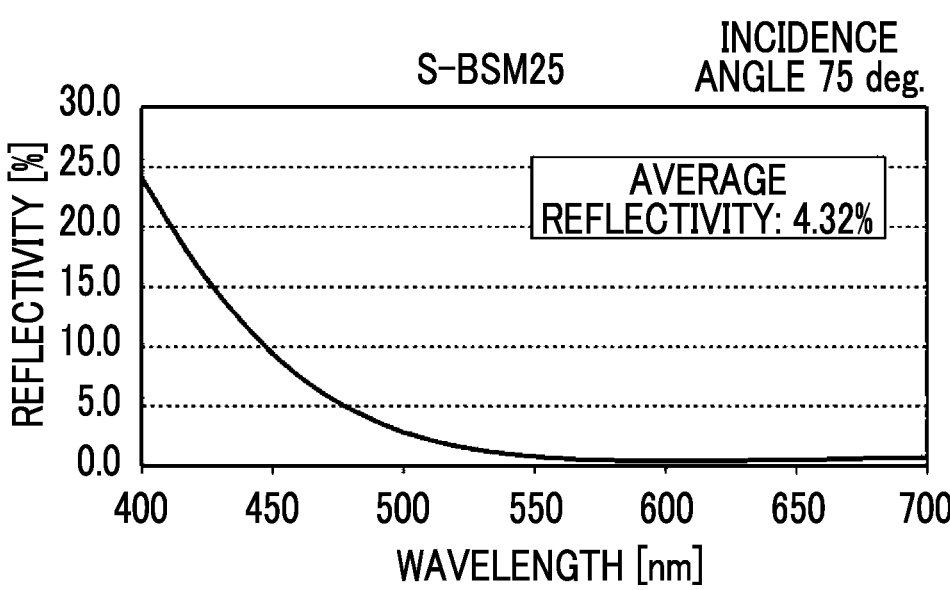
FIG. 20B is a diagram showing a wavelength dependence of a reflectivity with respect to an incidence angle of 75° for the half mirror of Reference Example 2.

With respect to the dielectric multi-layer film of Reference Example 2, FIG. 20A shows a wavelength dependence of a reflectivity for an incidence angle of 25°, and FIG. 20B shows a wavelength dependence of a reflectivity for an incidence angle of 75°.

As shown in FIGS. 20A and 20B, an average reflectivity at an incidence angle of 25° is 2.45% and an average reflectivity at an incidence angle of 75° is 4.32% with respect to light with a wavelength of 400 nm to 700 nm. Assuming that an incidence angle $\theta 1$ with respect to the first surface 31 is 25° and an incidence angle $\theta 2$ with respect to the second surface 32 is 75° in the half mirror 30 provided in the base 20, the average reflectivity in a case in which video light is incident on the second surface 32 exceeds 4%, and the average reflectivity increases as compared with Design Examples. However, since the average reflectivity in a case in which the video light is incident on the second surface is 10% or less, it is possible to obtain an effect of suppressing the light-dark pattern appearing due to interference between the stray light and the video light, that is, an effect of improving the contrast of the video can be obtained.

Reference Example 3

Table 14 shows Reference Example 3 of a dielectric multi-layer film in a case in which BK7 (manufactured by Shott Corporation) having a refractive index n=1.5191 was used as the base. A refractive index n1 of a first layer of two outermost layers of the dielectric multi-layer film was set in a range of 0.9n to 1.15n of the refractive index n of the base, and a refractive index n1 of an eleventh layer was set outside the range of 0.95n to 1.15n. In the simulation, the thickness of each layer was optimized by setting a target value of the reflectivity at the incidence angle of 25° to 3±0.5% and designing the reflectivity at the incidence angle of 75° to have a lowest value.

TABLE 14

| Reference Example 3 Layer configuration | Refractive index at 540 nm | Film thickness [nm] |
|---|---|---|
| Base (BK7) | 1.5191 | |
| 1 | 1.4910 | 10.0 |
| 2 | 1.6716 | 12.8 |

TABLE 14-continued

| Reference Example 3 Layer configuration | Refractive index at 540 nm | Film thickness [nm] |
|---|---|---|
| 3 | 1.4832 | 42.8 |
| 4 | 1.6716 | 10.0 |
| 5 | 1.4832 | 146.3 |
| 6 | 1.6716 | 10.0 |
| 7 | 1.4832 | 10.0 |
| 8 | 1.6716 | 10.0 |
| 9 | 1.4832 | 10.0 |
| 10 | 1.6716 | 60.0 |
| 11 | 1.3846 | 80.0 |
| Base (BK7) | 1.5191 | |

Figures 21A, 21B:
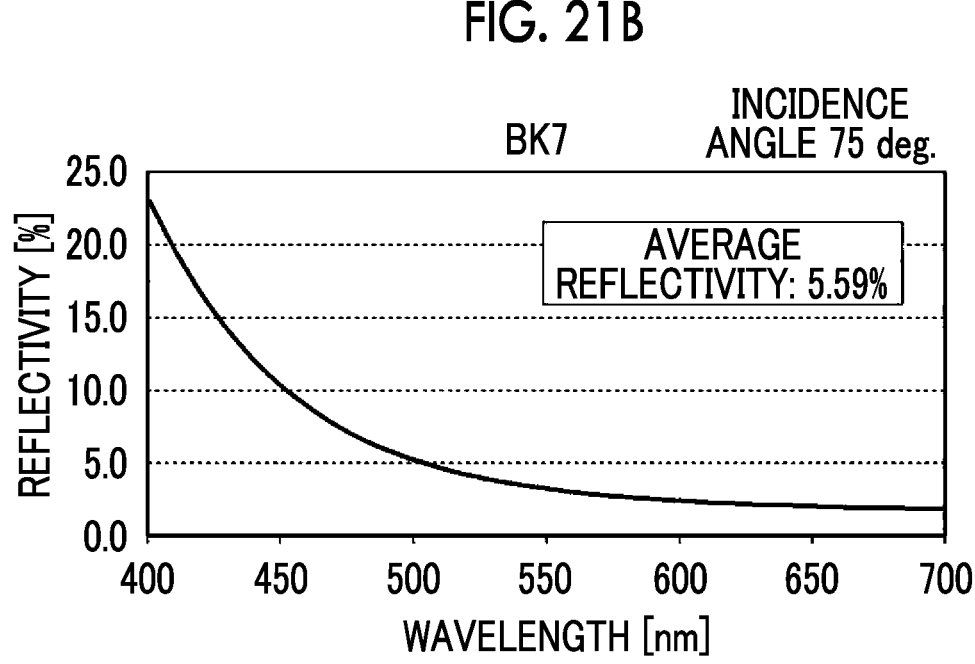
FIG. 21A is a diagram showing a wavelength dependence of a reflectivity with respect to an incidence angle of 25° for a half mirror of Reference Example 3.
FIG. 21B is a diagram showing a wavelength dependence of a reflectivity with respect to an incidence angle of 75° for the half mirror of Reference Example 3.

With respect to the dielectric multi-layer film of Reference Example 3, FIG. 21A shows a wavelength dependence of a reflectivity for an incidence angle of 25°, and FIG. 21B shows a wavelength dependence of a reflectivity for an incidence angle of 75°.

As shown in FIGS. 21A and 21B, an average reflectivity at an incidence angle of 25° is 2.73% and an average reflectivity at an incidence angle of 75° is 5.59% with respect to light with a wavelength of 400 nm to 700 nm. Assuming that an incidence angle $\theta 1$ with respect to the first surface 31 is 25° and an incidence angle $\theta 2$ with respect to the second surface 32 is 75° in the half mirror 30 provided in the base 20, the average reflectivity in a case in which video light is incident on the second surface 32 exceeds 4%, and the average reflectivity increases as compared with Design Examples. However, since the average reflectivity in a case in which the video light is incident on the second surface is 10% or less, it is possible to obtain an effect of suppressing the light-dark pattern appearing due to interference between the stray light and the video light, that is, an effect of improving the contrast of the video can be obtained.

As described above, in Reference Examples 1 to 3, the reflectivity of the second surface is larger than that in Design Examples 1 to 3. That is, by setting the refractive index of the two outermost layers of the dielectric multi-layer film to 0.90n to 1.15n in a case in which the refractive index of the base is n, as in Design Examples 1 to 3, the reflectivity of the second surface can be more effectively suppressed, and by setting the refractive index of the two outermost layers of the dielectric multi-layer film to 0.95n to 1.15n, the reflectivity of the second surface can be still more effectively suppressed. On the other hand, even though a condition that the refractive index of the two outermost layers of the dielectric multi-layer film is 0.90n to 1.15n or 0.95n to 1.15n in a case in which the refractive index of the base is n, as in Design Examples 1 to 3, is not satisfied, the average reflectivity of the video light to the second surface satisfies 10% or less, so that the contrast improvement effect of the video can be obtained in comparison with a case in which the average reflectivity of the video light to the second surface exceeds 10%.

"Production Method of Light Guide"

A production method of the light guide used in a sensory evaluation test will be described.

Seven substrates (SF11) having a thickness of 100 mm×100 mm×0.5 mm were prepared, and a half mirror made of a dielectric multi-layer film was formed on one surface of six substrates out of the seven substrates. Specifically, the dielectric multi-layer film shown in Design Example 1 was formed. Each layer shown in Design Example 1 was a silicon oxynitride film.

In this case, the nitrogen/oxygen flow rate ratio was set as shown in Table 15 below according to the nitrogen/oxygen flow rate ratio dependence of the refractive index shown in FIG. 8. The film thickness was as shown in Table 1. Sputtering conditions were as follows: Ar gas flow rate=60 sccm, $O_2+N_2$ gas flow rate=60 sccm, sputtering power=750 W, target diameter=6 inches, substrate temperature (setting)= 300° C., and sputtering gas pressure=0.2 Pa.

TABLE 15

| Design Example 1 Layer configuration | Refractive index at 540 nm | $N_2/O_2$ flow rate ratio |
|---|---|---|
| 1 | 1.795 | 0.41 |
| 2 | 1.6555 | 0.65 |
| 3 | 1.8888 | 0.24 |
| 4 | 1.6555 | 0.65 |
| 5 | 1.8888 | 0.24 |
| 6 | 1.6555 | 0.65 |
| 7 | 1.8888 | 0.24 |
| 8 | 1.6555 | 0.65 |
| 9 | 1.8888 | 0.24 |
| 10 | 1.6555 | 0.65 |
| 11 | 1.795 | 0.41 |
| Base (SF11) | 1.7934 | — |

After the film formation, the film was cut to have a size of 30 mm×30 mm with a slicer.

Next, the bonding surface of the substrate on which the dielectric multi-layer film was formed and the bonding surface of the substrate on which the dielectric multi-layer film was not formed were irradiated with an ion beam to perform cleaning and activation. As a device for irradiation with the ion beam, a device shown in Table 16 was used.

TABLE 16

| Ion gun | RFΦ12 cm ion beam assist source |
|---|---|
| Grid | Three-dish grid |
| Process gas | Ar |

Conditions for ion beam irradiation were as shown in Table 17.

TABLE 17

| Ar sputtering condition | Numerical value |
|---|---|
| Beam voltage [V] | 400 |
| Beam current [mA] | 75 |
| Acceleration voltage [V] | 600 |
| Degree of vacuum [Pa] | 0.05 |
| Irradiation time [min] | 5 |

After the ion beam irradiation, six substrates on which the dielectric multi-layer film was formed and one substrate on which the dielectric multi-layer film was not formed were stacked in the atmosphere, and then a load of 500 g/cm² was applied thereto and held for 1 hour, thereby obtaining a bonded body.

After that, the bonded body was cut as shown in FIGS. 12A and 12B, and then a light guide for a sensory test was obtained in which six half mirrors were disposed in the base at equal intervals with an inclination of 25° with respect to the first reflecting surface and the second reflecting surface. "Durability Evaluation"

Figure 22:
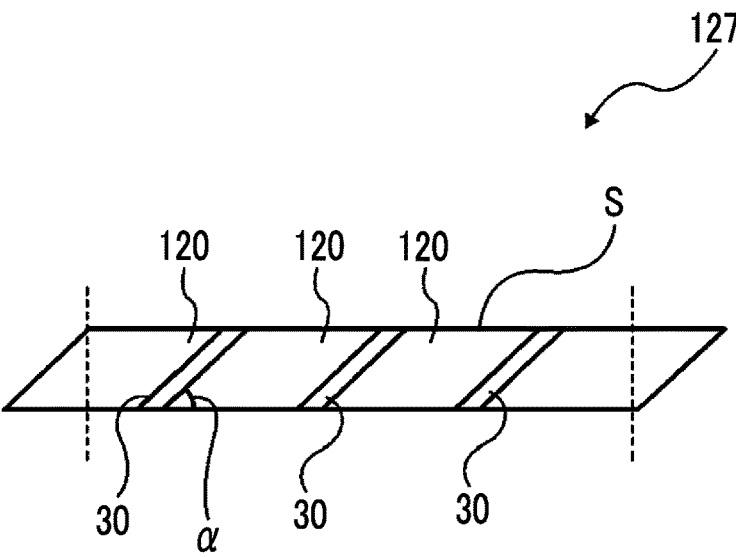
FIG. 22 is a diagram for explaining a sample piece for a strength test.

Next, results of verification of the mechanical strength and environmental durability of the light guide formed by performing bonding by optical contact as in the above-described manufacturing method will be described. In addition, for a durability test, a light guide 127 having a side parallelogram shape was cut out from a bonded body produced in the same manner as in the above-described manufacturing method, and as shown in FIG. 22, both ends of the light guide 127 were cut to produce 24 rectangular sample pieces S. An area of the cut end surface was 9 mm².
[Strength Test 1]

Figure 23:
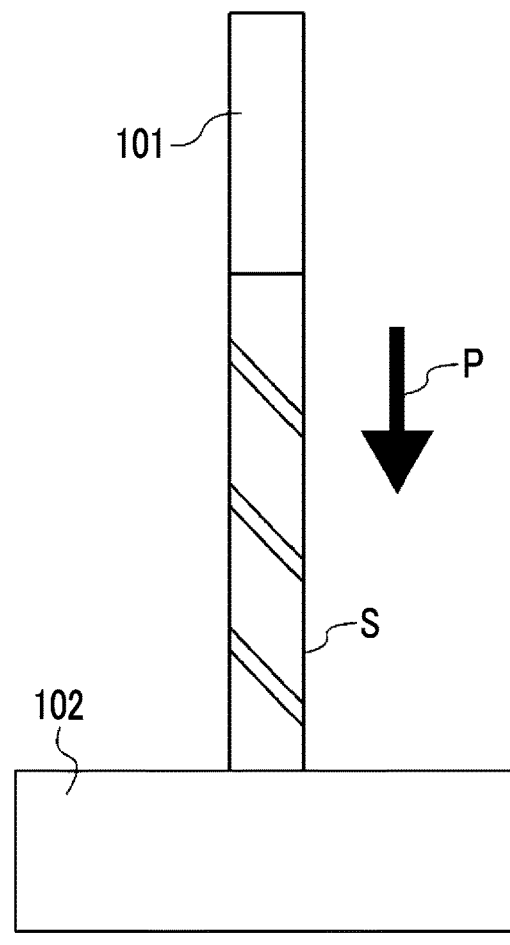
FIG. 23 is a schematic diagram for explaining an outline of a strength test.

A mechanical strength test was executed according to a JIS K 6852 test. A strength tester (model number DS2-500N) manufactured by IMADA Corporation was used. As shown in FIG. 23, after the sample piece S was placed between a probe 101 of the tester and a stainless steel table 102, a load P was gradually applied until fracture occurred. A strength test was performed on 12 sample pieces S for a strength test 1. Table 18 shows results of the fracture load for each sample piece.

TABLE 18

| Sample ID | Fracture load [kgf/cm²] |
|---|---|
| 1 | 16.19 |
| 2 | 17.18 |
| 3 | 14.41 |
| 4 | 13.67 |
| 5 | 15.01 |
| 6 | 16.50 |
| 7 | 14.39 |
| 8 | 18.01 |
| 9 | 13.41 |
| 10 | 14.38 |
| 11 | 12.09 |
| 12 | 13.05 |
| Fracture load average value | 14.86 |
| Standard deviation | 1.78 |

As a result of confirming the breakage of each sample piece, the number of samples in which the fracture occurred from the bonding surface was 0. In general, in a bonded member in which optical members are bonded to each other, the fracture occurs at a bonding surface, but in all the sample pieces, the fracture occurred at a portion other than the bonding surface. From this result, the average adhesion strength (=average fracture load/sample area) for a plurality of samples is calculated as 1618 N/cm² from the fracture strength of 14.86 kgf, the sample area of 0.09 cm², and 1 kgf=9.8 N. Therefore, it can be estimated that the adhesion strength of the bonding surface by the optical contact is 1500 N/cm² or more.

Further, as a reliability test, assuming that the product is to be placed in a poor environment, a high-temperature and high-humidity test and a thermal shock test were performed, followed by a strength test using the same method as described above.
[Strength Test 2]

As the high-temperature and high-humidity test, six sample pieces S for a strength test 2 were stored in an environment of 85° C. and 85 RH % for 168 hours. After that, a strength test was performed in the same manner as described above. Table 19 shows results of the fracture load for each sample piece.

TABLE 19

| Sample ID | Fracture load [kgf/cm²] |
|---|---|
| 1 | 14.46 |
| 2 | 15.56 |
| 3 | 17.31 |
| 4 | 15.94 |
| 5 | 16.28 |
| 6 | 16.22 |
| Fracture load average value | 15.96 |
| Standard deviation | 0.94 |

[Strength Test 3]

As the thermal shock test, with respect to six sample pieces S for a strength test 3, storage in a temperature tank at 80° C. for 30 minutes and storage in a temperature tank at −20° C. for 30 minutes as one cycle were repeated for 168 cycles with a temperature tank transfer time of 5 minutes or less. After that, a strength test was performed in the same manner as described above. Table 20 shows results of the fracture load for each sample piece.

TABLE 20

| Sample ID | Fracture load [kgf/cm²] |
|---|---|
| 1 | 13.83 |
| 2 | 13.95 |
| 3 | 14.25 |
| 4 | 13.10 |
| 5 | 13.85 |
| 6 | 14.77 |
| Fracture load average value | 13.96 |
| Standard deviation | 0.55 |

In both the strength tests 2 and 3, as a result of confirming the breakage of the sample, the number of samples in which the fracture occurred from the bonding surface was 0 as in the case of the strength test 1. From this result, it was found that the adhesion strength of the bonded surfaces bonded by the optical contact hardly deteriorated even in an environment of high temperature and high humidity and thermal shock. In addition, also in these strength tests, the bonding strength was estimated to be 1500 N/cm².

As described above, in manufacturing the light guide, high mechanical strength and environmental reliability could be formed of the optical contact.

The disclosure of JP2020-219155 filed on Dec. 28, 2020 is incorporated herein by reference in its entirety.

All documents, patent applications, and technical standards described in the present specification are herein incorporated by reference to the same extent that each individual document, patent application, or technical standard was specifically and individually indicated to be incorporated by reference.

What is claimed is:

1. A light guide comprising:
a base that has a first reflecting surface and a second reflecting surface and that propagates incident video light while totally reflecting the video light by the first reflecting surface and the second reflecting surface; and
a plurality of half mirrors, each of which has a first surface and a second surface on a back side of the first surface and is configured to include a dielectric multi-layer film,
wherein the plurality of half mirrors are disposed in the base such that the half mirrors are spaced from each other by being tilted with respect to the first reflecting surface and the second reflecting surface,
the base and the plurality of half mirrors are configured such that the video light made incident into the base is incident on each of the first surface and the second surface of at least one of the plurality of half mirrors one or more times,
refractive indices of two outermost layers of the dielectric multi-layer film on a first surface side and a second surface side are 0.90n to 1.15n in a case in which a refractive index of the base is n, and
each of the plurality of half mirrors has an average reflectivity of 2% to 4% with respect to light with a wavelength of 400 nm to 700 nm that is incident at an incidence angle of 5° to 35°, and has an average reflectivity of 10% or less with respect to the light incident at an incidence angle of 55° to 85°, wherein the video light is partially reflected by each of the plurality of half mirrors disposed in the base and emitted from the base as emitted light to make a user visually recognize the video.

2. The light guide according to claim 1,
wherein the refractive indices of the outermost layers of the dielectric multi-layer film are 0.95n to 1.10n.

3. The light guide according to claim 1,
wherein the refractive indices of the outermost layers of the dielectric multi-layer film are 1.00n to 1.05n.

4. The light guide according to claim 1,
wherein, in a case in which film thicknesses of the outermost layers of the dielectric multi-layer film are d [nm], the refractive indices of the outermost layers are n1, and $\Delta n = \{(n-n1)/n\} \times 100$ [%], $\Delta n \cdot d$ [% nm] is in a range of −300 to +300.

5. The light guide according to claim 1,
wherein a tilt angle of each of the pluralities of half mirrors with respect to the first reflecting surface and the second reflecting surface is such that in a case in which the video light made incident into the base is incident on the first surface at an incidence angle of 5° to 35°, transmitted light transmitted through each of the pluralities of half mirrors of the incident video light is able to be re-incident from the second surface after being reflected by the first reflecting surface or the second reflecting surface.

6. The light guide according to claim 5,
wherein the tilt angle of each of the pluralities of half mirrors is an angle in which an incidence angle in a case in which the transmitted light is re-incident from the second surface is in a range of 55° to 85°.

7. The light guide according to claim 1,
wherein, in the dielectric multi-layer film, a layer of a first refractive index having a first refractive index and a layer of a second refractive index having a second refractive index which is higher than the first refractive index, are alternately laminated.

8. The light guide according to claim 1,
wherein at least one of the two outermost layers of the dielectric multi-layer film and the base are bonded by optical contact.

9. The light guide according to claim 1,
wherein the two outermost layers of the dielectric multi-layer film and the base are in direct contact with each other.

10. The light guide according to claim 1,
wherein no adhesive is present between each of the pluralities of half mirrors and the base.

11. The light guide according to claim 1,
wherein each layer of the dielectric multi-layer film contains silicon, oxygen, and nitrogen.

12. The light guide according to claim 1,
wherein each layer of the dielectric multi-layer film is a metal oxide layer containing at least one of silicon, niobium, tantalum, aluminum, titanium, tungsten, or chromium.

13. The light guide according to claim 1,
wherein the refractive index of the base is 1.5 or more.

14. The light guide according to claim 1,
wherein the base is a parallel flat plate in which the first reflecting surface and the second reflecting surface are parallel to each other.

15. The light guide according to claim 1, wherein the plurality of half mirrors are arranged in parallel to each other in a direction in which the video light propagates.

16. A video display device comprising:

a video light generation unit that generates video light;

the light guide according to claim 1, which propagates the incident video light; and an optical coupling member that makes the video light generated by the video light generation unit incident into the light guide.

\* \* \* \* \*